US012629609B2

(12) United States Patent (10) Patent No.: US 12,629,609 B2
Gallop et al. (45) Date of Patent: May 19, 2026

(54) SYSTEMS AND METHODS FOR RECYCLING ENERGY FROM DISTILLATION

(71) Applicant: ICM, Inc., Colwich, KS (US)

(72) Inventors: Charles C. Gallop, Gower, MO (US); Christopher Riley William Gerken, Helena, MO (US)

(73) Assignee: ICM, Inc., Colwich, KS (US)

( * ) Notice: Subject to any disclaimer, the term of this patent is extended or adjusted under 35 U.S.C. 154(b) by 211 days.

(21) Appl. No.: 18/434,983

(22) Filed: Feb. 7, 2024

(65) Prior Publication Data

US 2025/0249376 A1     Aug. 7, 2025

(51) Int. Cl.
| | |
|---|---|
| *B01D 3/00* | (2006.01) |
| *F25B 9/00* | (2006.01) |
| *F25B 30/02* | (2006.01) |
| *F25B 40/06* | (2006.01) |
| *F25B 41/40* | (2021.01) |
| *F25B 27/02* | (2006.01) |

(52) U.S. Cl.
CPC .............. *B01D 3/007* (2013.01); *F25B 9/008* (2013.01); *F25B 30/02* (2013.01); *F25B 40/06* (2013.01); *F25B 41/40* (2021.01); *F25B 27/02* (2013.01); *F25B 2339/047* (2013.01)

(58) Field of Classification Search
CPC ......... B01D 3/007; B01D 3/001; F25B 41/40; F25B 30/02; F25B 27/02
See application file for complete search history.

(56) References Cited

U.S. PATENT DOCUMENTS

| | | | |
|---|---|---|---|
| 6,205,811 | B1 | 3/2001 | Alencon |
| 8,608,841 | B2 | 12/2013 | Mcgregor et al. |
| 9,221,735 | B2 | 12/2015 | Sonnek et al. |
| 9,925,476 | B2 | 3/2018 | Crawford et al. |
| 10,220,371 | B2 | 3/2019 | Zaiser et al. |
| 2014/0061958 | A1 | 3/2014 | Sparrow et al. |
| 2018/0045080 | A1* | 2/2018 | Uechi ..................... F02C 7/143 |
| 2022/0016543 | A1 | 1/2022 | Crawford et al. |
| 2022/0219097 | A1* | 7/2022 | Hoehn ................. C10G 67/049 |

FOREIGN PATENT DOCUMENTS

| | | |
|---|---|---|
| CN | 103908788 B | 12/2015 |
| CN | 105536276 A | 8/2017 |
| CN | 105498259 A | 2/2018 |
| CN | 113577799 A | 11/2021 |
| CN | 114100165 A | 3/2022 |
| FR | 2998301 A1 * | 5/2014 ............... B01D 1/28 |

OTHER PUBLICATIONS

English machine translation of FR 2 998 301 (Year: 2014).*
Patent Cooperation Treaty, International Search Report and Written Opinion Received in International Application No. PCT/US2025/014932.

* cited by examiner

*Primary Examiner* — Renee Robinson
(74) *Attorney, Agent, or Firm* — SNELL & WILMER L.L.P.

(57) ABSTRACT

A system for recycling energy in a production plant comprises a distillation device configured to generate a heated vapor in response to distillation and a system configured to recycle heat from the heated vapor back into the production plant. The system for recycling heat can comprise a fin-fan heat exchanger and a compressor or a heat pump with a heat exchanger configured as an evaporator and a heat exchanger configured as a condenser.

20 Claims, 14 Drawing Sheets

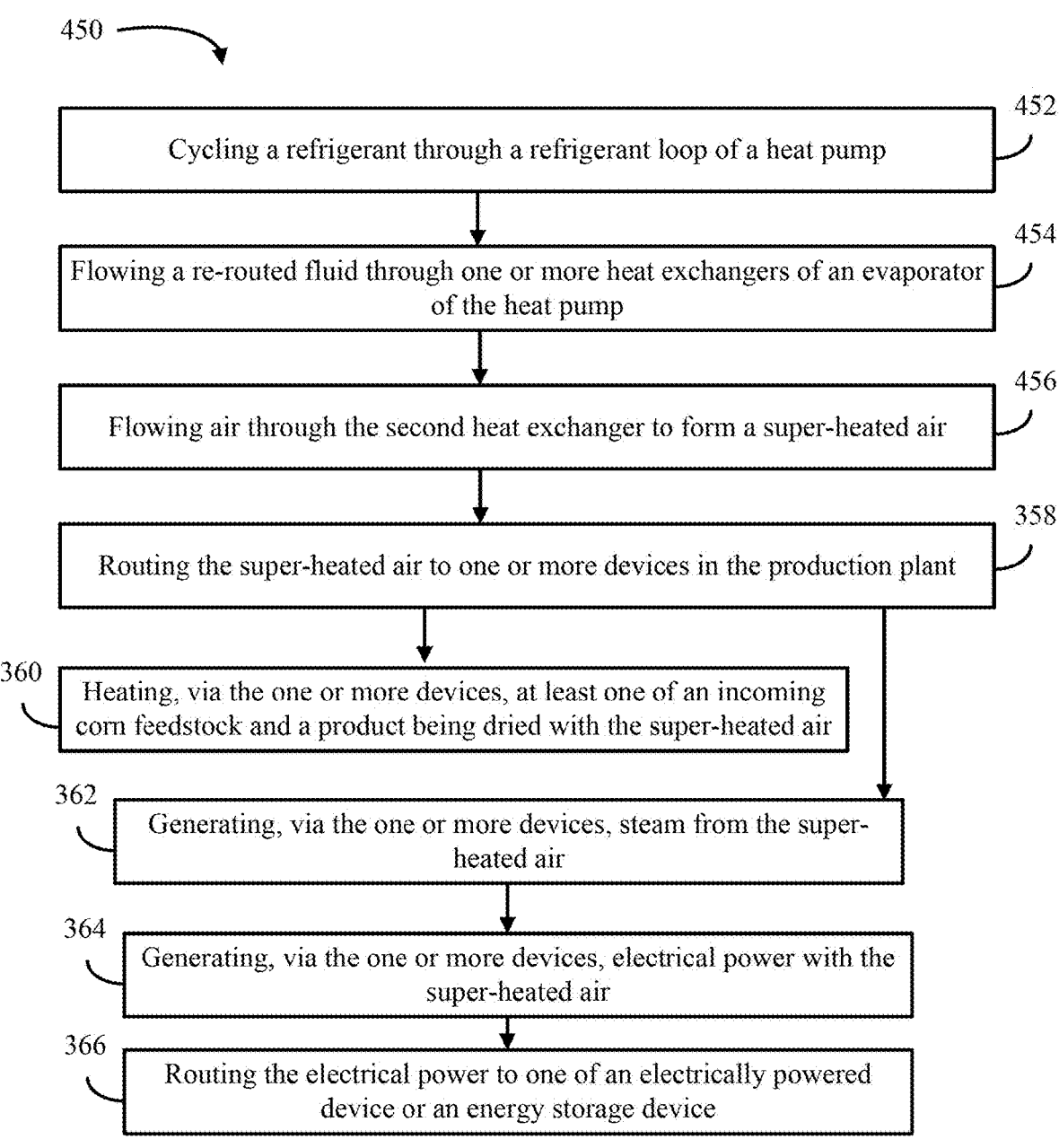

450

452 Cycling a refrigerant through a refrigerant loop of a heat pump

454 Flowing a re-routed fluid through one or more heat exchangers of an evaporator of the heat pump 456 Flowing air through the second heat exchanger to form a super-heated air 358 Routing the super-heated air to one or more devices in the production plant 360 Heating, via the one or more devices, at least one of an incoming corn feedstock and a product being dried with the super-heated air 362 Generating, via the one or more devices, steam from the super-heated air 364 Generating, via the one or more devices, electrical power with the super-heated air 366 Routing the electrical power to one of an electrically powered device or an energy storage device

FIG. 9

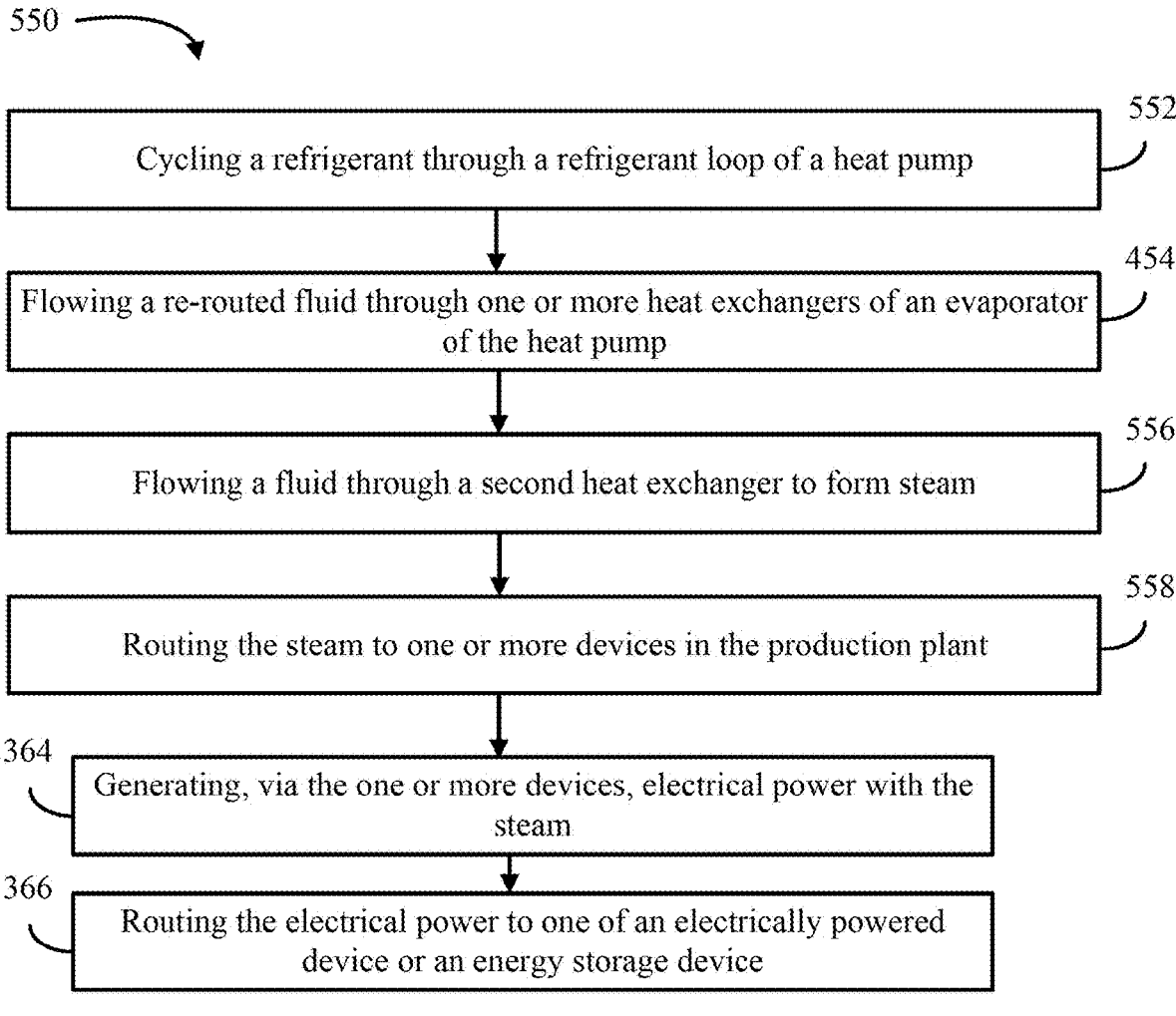

550

552 Cycling a refrigerant through a refrigerant loop of a heat pump

454 Flowing a re-routed fluid through one or more heat exchangers of an evaporator of the heat pump 556 Flowing a fluid through a second heat exchanger to form steam 558 Routing the steam to one or more devices in the production plant 364 Generating, via the one or more devices, electrical power with the steam 366 Routing the electrical power to one of an electrically powered device or an energy storage device

FIG. 10

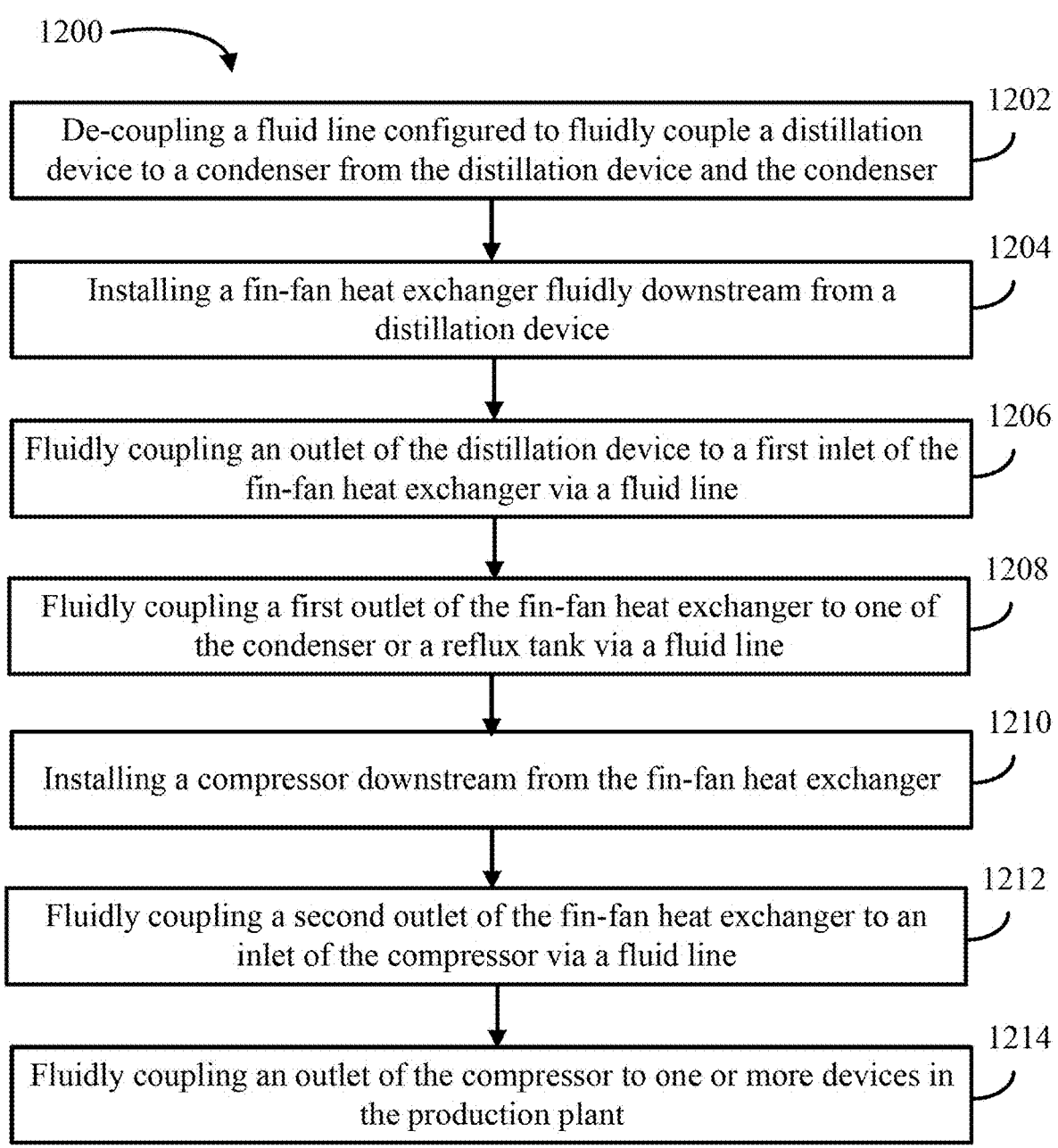

1200

De-coupling a fluid line configured to fluidly couple a distillation device to a condenser from the distillation device and the condenser — 1202

Installing a fin-fan heat exchanger fluidly downstream from a distillation device — 1204

Fluidly coupling an outlet of the distillation device to a first inlet of the fin-fan heat exchanger via a fluid line — 1206

Fluidly coupling a first outlet of the fin-fan heat exchanger to one of the condenser or a reflux tank via a fluid line — 1208

Installing a compressor downstream from the fin-fan heat exchanger — 1210

Fluidly coupling a second outlet of the fin-fan heat exchanger to an inlet of the compressor via a fluid line — 1212

Fluidly coupling an outlet of the compressor to one or more devices in the production plant — 1214

FIG. 12

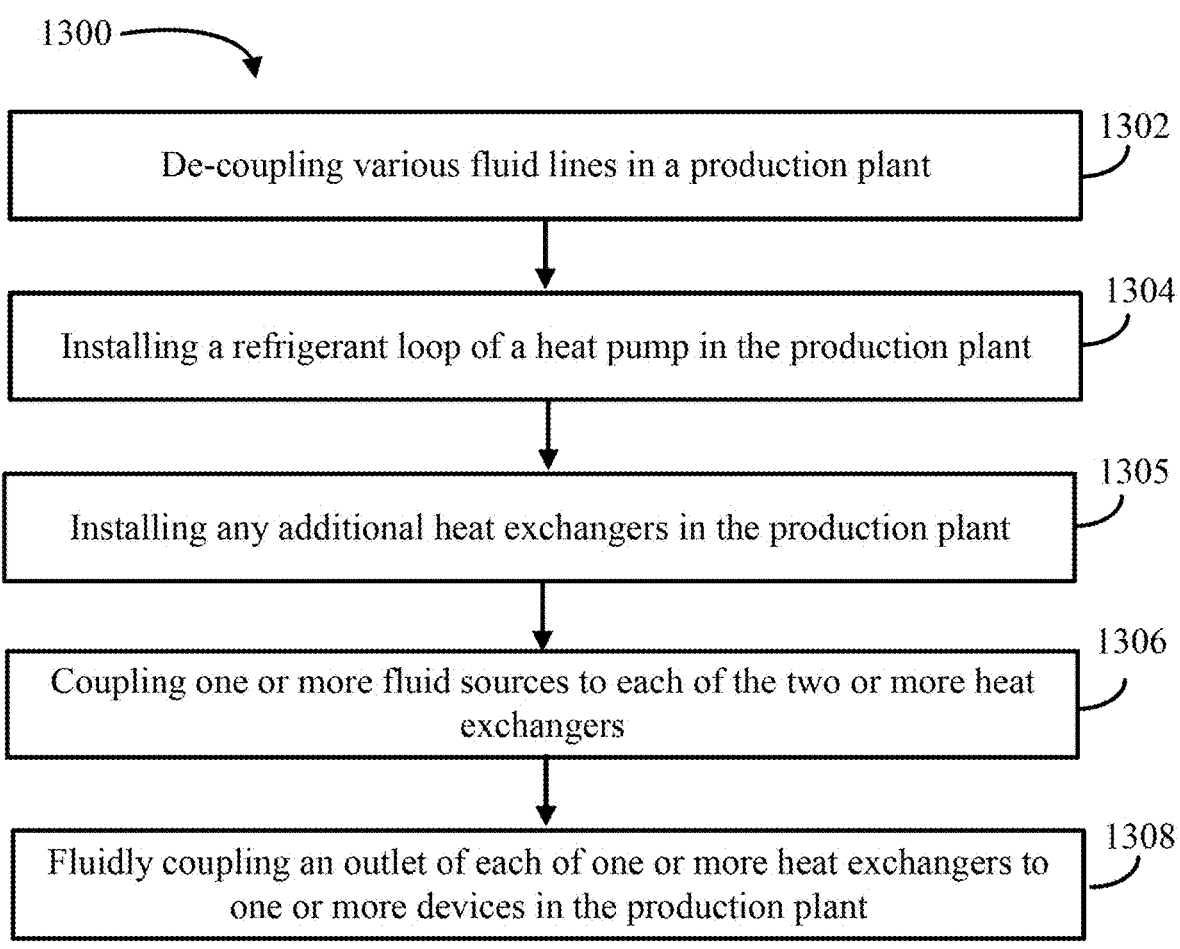

1300

| 1302 | De-coupling various fluid lines in a production plant |

1304 | Installing a refrigerant loop of a heat pump in the production plant |

1305 | Installing any additional heat exchangers in the production plant |

1306 | Coupling one or more fluid sources to each of the two or more heat exchangers |

1308 | Fluidly coupling an outlet of each of one or more heat exchangers to one or more devices in the production plant |

FIG. 13

SYSTEMS AND METHODS FOR RECYCLING ENERGY FROM DISTILLATION

FIELD

The present disclosure generally relates to systems and methods for recycling energy in an ethanol production process.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

Reduction in a carbon footprint for industrial production plants for the distillation of an alkane solvent (e.g., ethanol, butanol, methanol, propanol, or the like) has been a persistent problem for producers. Reducing a plant's carbon footprint has been a well-recognized problem for centuries. For example, as early as 1983, a report from US National Academy of Sciences and the Environmental Protection Agency indicated greenhouse gas emissions can have potential impacts on the environment. In 1988, a conference in Toronto called for strict, specific limits on Greenhouse gas emissions, and an Intergovernmental Panel on Climate Change (IPCC) was established. In 1990, the first IPCC report indicated that the world has been warming and future warming appeared likely. More recently, in 2021, the sixth IPCC report warned that catastrophic outcomes cannot be ruled out, and a Glasgow conference produced pledges to restrict emissions. Accordingly, the problem of reducing a carbon footprint for industrial production plants has been a long-felt need in the art of production plants for distillation of an alkane solvent.

One solution that those skilled in the art have deployed is called combined heat and power ("CHP") technology. CHP produces electricity and thermal energy at high efficiencies using a range of technologies and fuels. With on-site power production, losses can be minimized and heat that would otherwise be wasted is applied to facility loads in the form of process heating, steam, hot water, or even chilled water. Typically, CHP technology utilized in production plants utilizes turbine engines that are connected to an electrical generator. Accordingly, instead of burning natural gas or propane in a combustion reaction to make steam, and in turn rotating that generator, energy is input into a combustion chamber inside of a turbo shaft engine. The expanding hot air turns a fan, and that fan then turns the shaft, which turns the generator to produce electricity. However, there is an issue with CHP technology. First, natural gas has to be burned in the combustion chamber. Accordingly, CHP technology does not displace the natural gas. Second, there are energy losses in converting mechanical energy to electrical energy. Accordingly, although there are efficiency gains by utilizing CHP, the efficiency gains are not substantial.

A second potential solution is mechanical vapor recompression ("MVR"). MVR utilizes a large turbo compressor, which utilizes an electric motor to turn the turbo compressor or utilizes steam to turn the turbo compressor. The compressed vapor is then recycled and fed back to a distillation device to help heat the liquor and produce more vapor and steam. If steam is utilized to turn the turbo compressor, then the steam is generated by utilizing natural gas. Accordingly, although efficiencies may be gained, again natural gas is not being displaced, and the efficiency gains are not substantial.

Accordingly, the long-felt need of substantial reduction of a carbon footprint for industrial production plants has not been satisfied by MVR technology or CHP technology.

SUMMARY

A system for recycling energy in a production plant comprises a distillation device configured to generate a heated vapor in response to distillation and a system configured to recycle heat from the heated vapor back into the production plant. In various embodiments, the system for recycling heat can comprise a fin-fan heat exchanger/compressor configuration or a heat pump configuration.

In the fin-fan heat exchanger/compressor configuration, air can be heated by allowing the air to absorb heat from a heated vapor that is produced in the distillation device. The heated air can be supplied to a compressor to super-heat the air. The super-heated air that is output from the compressor can be utilized in one or more devices within the production plant to reduce a carbon footprint of the production plant, in accordance with various embodiments.

In the heat pump configuration, a heat exchanger configured as an evaporator can evaporate a refrigerant by allowing the refrigerant to absorb heat from the heated vapor. As the refrigerant is later cycled through a compressor and into a heat exchanger that is configured as a condenser, a fluid can be flowed through the heat exchanger to absorb the heat from the refrigerant and form a super-heated fluid (e.g., steam, super-heated air, or the like). The super-heated fluid can then be repurposed for use in one or more devices within the production plant to reduce a carbon footprint of the production plant, in accordance with various embodiments.

Various retrofitting processes are disclosed herein. In various embodiments, a retrofitting process can comprise installing the fin-fan heat exchanger/compressor configuration in a production plant or installing the heat pump configuration in a production plant. The installation can involve re-arranging a condenser (e.g., an evaporative cooling tower) or replacing the condenser with one of the fin-fan heat exchanger or a heat exchanger configured as an evaporator of the heat pump. The retrofitting process can further comprise fluidly coupling an output of a compressor in the fin-fan heat exchanger/compressor configuration to one or more devices within the production plant, or fluidly coupling an output of a heat exchanger configured as a condenser for the heat pump in the heat pump configuration to one or more devices in the production plant.

In various embodiments, the production plant is configured to produce an alkane solvent. In various embodiments, the alkane solvent can comprise ethanol butanol, methanol, propanol, or any other alkane solvent.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 9 illustrates a method of operating the system of FIGS. 4, 6, and/or 8, in accordance with various embodiments.

FIG. 10 illustrates a method of operating the system of FIGS. 5, 7, and/or 8, in accordance with various embodiments

FIG. 12 illustrates a retrofitting process for retrofitting the system of FIG. 2 with the system of FIG. 3A.

FIG. 13 illustrates a retrofitting process for retrofitting the system of FIG. 2 with the system of FIG. 4, 5, 6, 7, or 8, in accordance with various embodiments.

DETAILED DESCRIPTION

Figure 1:
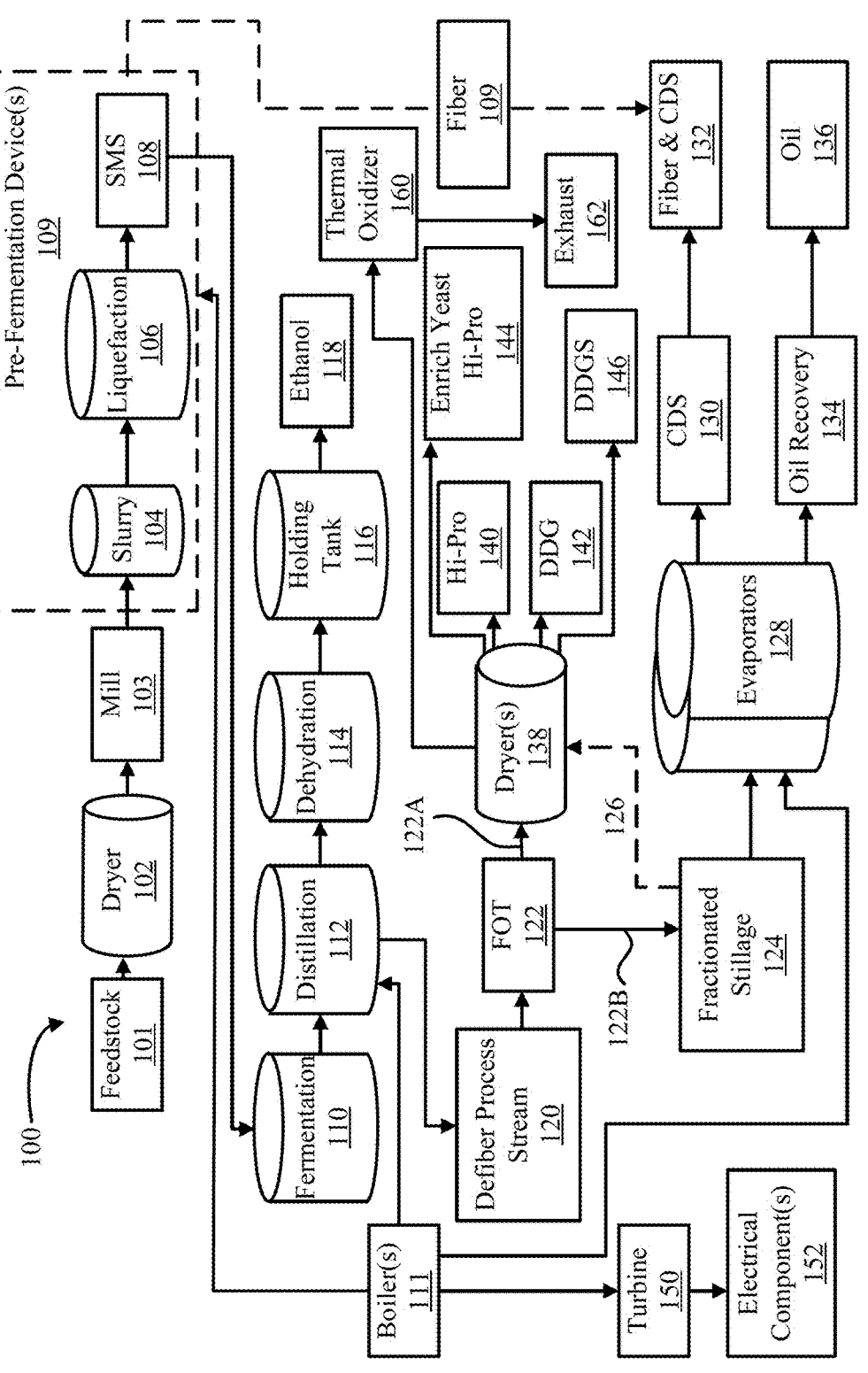
FIG. 1 illustrates a process for production of an alkane solvent in a production plant, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

"A heat transfer region" as referred to herein is a portion of the heat exchanger where a first fluid (e.g., air, a working fluid, or the like) interacts with a second fluid (e.g., air, a working fluid, or the like), to transfer heat from the first fluid to the second fluid or vice versa.

A "fluid line" as referred to herein is a fluid conduit configured to facilitate a flow of fluid therethrough. A fluid line can comprise a tube assembly, a plurality of tube assemblies coupled together to form a fluid conduit therethrough, a duct, or any other fluid conduit known in the art.

Disclosed herein is a system for recycling energy in a production plant for the distillation of an alkane solvent (e.g., ethanol, butanol, methanol, propanol, or the like). In various embodiments, the system disclosed herein is a production plant for the distillation of ethanol. As described further herein, the system can be retrofitted into an existing production plant or integrated into a newly manufactured production plant. The present disclosure is not limited in this regard.

The system recycles energy that is generated from at least one of a fermentation process (e.g., via a fermentation device, a fermentation feed, or the like), or a distillation process (e.g., via a distillation device, an output of a distillation device, or the like). In various embodiments, the systems and methods herein can recycle energy from one or more locations within a production plant and greatly reduce a carbon footprint of the production plant, as described further herein.

For example, energy that is output from a distillation device is typically dissipated through an evaporative cooling tower for use in the production plant. In this regard, a non-traditional type of heat exchanger can be utilized by the system to capture waste heat and energy from a heated vapor generated from the distillation device, the captured heat and energy can be compressed to increase the temperature and form a super-heated fluid, and the system can re-use the super-heated fluid in one or more devices in the production plant, in accordance with various embodiments. In various embodiments, the system can utilize the heat and energy from the heated vapor from the distillation device as an evaporator in a refrigerant loop of a heat pump. In this regard, the heat and energy from the heated vapor can act as a heat source for the refrigerant as the refrigerant travels through a heat exchanger configured as the evaporator of the heat pump. In various embodiments, the system disclosed herein allows for water savings through the cooling tower and greatly reduces a carbon footprint of the production plant.

A retrofitting process to form the system for recycling energy in a production plant for the distillation of an alkane solvent is disclosed herein. In a typical ethanol production plant, a distillation device (e.g., a rectifier) generates overhead vapor that is about 190 proof and approximately 135° F. (57° C.). Latent heat of condensation is typically wasted through an evaporative cooling tower. Accordingly, the retrofitting process can comprise installing a fin-fan heat exchanger between the distillation device and an evaporative cooling tower (e.g., between a rectifier overhead and a condenser), installing a compressor downstream from the heat exchanger, and fluidly coupling the compressor to one or more devices disposed within the production plant, in accordance with various embodiments. The fin-fan heat exchanger can be configured to pull ambient air through the heat exchanger, which in turn will condense the heated vapor and heat the air. The heated air can be drawn through a compressor, which increases the temperature and pressure of the heated air to form a super-heated air. The outlet of the compressor can then be fluidly coupled to one or more devices (e.g., a dryer, a boiler, an evaporator, a turbine, or the like) in the production plant that are adaptable to utilize the super-heated air.

In various embodiments, for a heat pump configuration, a retrofitting process can comprise installing a heat pump with a first heat exchanger configured as an evaporator of the heat pump and a second heat exchanger configured as a condenser of the heat pump, fluidly coupling the distillation device to an inlet of the first heat exchanger, fluidly coupling an outlet of the first heat exchanger to an evaporative cooling tower, and fluidly coupling an outlet of the second heat exchanger to one or more devices in the production plant. In this regard, the outlet of the second heat exchanger can be configured to receive a fluid that is heated by the refrigerant traveling through the second heat exchanger. This heated fluid can then be utilized in the production plant by the one or more devices that are adaptable to utilize the super-heated fluid.

Referring now to FIG. 1, a process 100 performed in a dry grind mill of an ethanol production plant is illustrated, in accordance with various embodiments. In various embodiments, the process 100 may operate in a continuous manner. However, the present disclosure is not limited in this regard. For example, the process 100 can operate in a batch process or a combination of batch and continuous processes and still be within the scope of this disclosure.

The process 100 may receive feedstock 101 of a grain. The feedstock 101 can include, but is not limited to, barley, beets, cassava, corn, cellulosic feedstock, grain (e.g., oil seeds, such as soybeans, grape seeds, mustard seeds, etc.), milo, oats, potatoes, rice, rye, sorghum grain, triticale, sweet potatoes, lignocellulosic biomass, wheat, and the like, or pulp. Lignocellulosic biomass may include corn fiber, corn stover, corn cobs, cereal straws, sugarcane bagasse and dedicated energy crops, which are mostly composed of fast growing tall, woody grasses, including, but not limited to, switch grass, energy/forage sorghum, miscanthus, and the like. Also, the feedstock 101 may further include, grain fractions or by-products as produced by industry, such as hominy, wheat middlings, corn gluten feed, Distillers Dried Grains with Solubles, and the like. The feedstock 101 may include, an individual type, a combined feedstock of two types, of multiple types, or any combination or blend of the above grains. The feedstock 101 may include, but is not limited to, one to four different types combined in various percentage ranges. The feedstock 101 may be converted into different types of products and co-products that may include, but is not limited to, ethanol, syrup, distillers oil, distillers dried grains, distillers dried grains with solubles, condensed distillers solubles, wet distillers grains, and the like. In this application, there will be pounds of high protein animal feed products, enrich yeast product, and other types of products. For instance, a bushel of corn may produce about 17-19 pounds of ethanol, about 17-18 pounds of DDGS, and 17-18 pounds of carbon dioxide. The carbon dioxide can be captured and compressed into liquid carbon dioxide or dry ice for commercial applications.

For brevity purposes, the process 100 of using a single stream of feedstock will be described with reference to FIG. 1. As an example, corn may be used as a single feedstock (e.g., feedstock 101) in the process 100 (e.g., a dry grind process). Corn may be broken down into its major components of endosperm, germ, bran, and tip cap. Each of these major components may be further broken down to their smaller components. The endosperm, the germ, the bran, and the tip cap each contain varying amounts of starch, protein, oil, fiber, ash, sugars, etc. For example, the amounts of the components in corn may include, but are not limited to, about 70 to 74% starch, about 7 to 9% protein, about 3 to 4% oil, about 7 to 9% fiber, about 1 to 2% ash, about 1 to 2% sugars, and others.

The process 100 can comprise pre-heating the feedstock 101 in a dryer 102 prior to milling the feedstock 101 in a mill 103. For example, in various embodiments, feedstock 101 is wet prior to performing the process 100. Accordingly, by pre-drying the feedstock in the dryer 102, moisture can be removed from the feedstock 101 prior to milling in the mill 103 of process 100. In various embodiments, the dryer 102 can comprise a resistance heater (e.g., the electrical component 152 as described further herein can be a resistance heater of the dryer 102).

The process 100 comprises feeding the feedstock 101 dried by the dryer 102 into a mill 103 (e.g., hammer mills, roller mills, or the like) to grind the feedstock 101 into a meal, a powder, or a flour to achieve an appropriate particle size. This grinding, via mill 103, serves to break an outer coating of the corn kernel and increases a surface area to expose starch for penetration of water in cooking. This initial grinding of the feedstock 101 affects the particle size further down the processes. In various embodiments, the mill 103 can comprise a grinder (e.g., the electrical component 152 as described further herein can be a grinder of the mill 103) to grind the dried feedstock 101.

The process 100 sends the ground material from the mill 103 to slurry 104. Next, the process 100 adds water, backset, and/or enzymes to the feedstock 101 that has been ground via mill 103 to create a slurry 104 in a slurry tank. In various embodiments, the process 100 adds a liquefying enzyme, such as alpha-amylase to this mixture. The alpha-amylase enzyme hydrolyzes and breaks starch polymer into short sections, dextrins, which are a mix of oligosaccharides. The process 100 maintains a temperature between about 60° C. to about 100° C. (about 140° F. to about 212° F., about 333 K to about 373 K) in the slurry 104 to cause the starch to gelatinize and a residence time of about 30 to about 60 minutes to convert insoluble starch in the slurry 104 to soluble starch. The slurry 104 may have suspended solids content of about 26% to about 40%, which includes starch, fiber, protein, and oil.

In various embodiments, the process 100 can pump the slurry 104 to jet cookers to cook the slurry 104. Jet cooking may occur at elevated temperatures and pressures. For example, jet cooking may be performed at a temperature of about 104° C. to about 150° C. (about 240° F. to about 302° F.) and at an absolute pressure of about 1.0 to about 6.0 kg/cm$^2$ (about 15 to 85 lbs/in$^2$) for about five minutes. Jet cooking is another method to gelatinize the starch. In various embodiments, as described further herein, a jet cooker can be retrofitted to receive steam (e.g., from a boiler configured to receive a super-heated air or from a liquid-to-liquid heat exchanger). The steam can be generated from recycling energy from a distillation device as described further herein. In various embodiments, the system can comprise one or more pumps for pumping the slurry 104 to jet cookers. The one or more pumps include motors to power the one or more pumps (e.g., the electrical component 152 as described further herein can be a motor for one or more pumps used in the process 100). Although described as being used in the process 100 to pump the slurry 104 to jet cookers, the present disclosure is not limited in this regard. For example, one or more pumps can be used at various points in the process 100 and powered by an electrically powered component (e.g., electrical component 152) and still be within the scope of this disclosure.

The process 100 further comprises sending the slurry 104 to liquefaction 106, which converts the slurry to a mash. In various embodiments, the process 100 uses a temperature range of about 80° C. to about 150° C. (about 176° F. to about 302° F., about 353 K to about 423 K) to hydrolyze the gelatinized starch into maltodextrins and oligosaccharides to produce a liquefied mash. Here, the process 100 produces a mash stream, which has about 26% to about 40% total solids content. The mash may have suspended solids content that includes protein, oil, fiber, grit, and the like. In various embodiments, one or more liquefaction tanks may be used in liquefaction 106. In various embodiments, the process 100 may add another enzyme, such as glucoamylase in the liquefaction 106 to break down the dextrins into simple sugars.

At liquefaction 106, the process 100 obtains the process stream or a mixture from the slurry 104. In other embodiments, the process 100 may obtain a process stream or mixture as slurry 104 from a slurry tank, from a jet cooker, from a first liquefaction tank, from a second liquefaction tank, or after a pretreatment process in cellulosic production facility, or the like. The present disclosure is not limited in this regard.

In various embodiments, after liquefaction 106, the process stream is fed to a selective milling system ("SMS") 108. The SMS 108 can be configured to increase a starch recovery from grain and/or to remove fiber 109 (e.g., as shown in the dotted line) before sending the process stream to fermentation 110. The process 100 can send the fiber 109 to a feed area, avoiding fermentation, distillation, dehydration, and drying (i.e., back end processes).

At liquefaction 106, SMS 108 obtains the process stream or a mixture from the slurry 104. In various embodiments, the SMS 108 may obtain the process stream or mixture as slurry 104 from a slurry tank, from a jet cooker, from a first liquefaction tank, from a second liquefaction tank, or after a pretreatment process in cellulosic production facility. The present disclosure is not limited in this regard.

At fermentation 110, the process 100 adds a microorganism to the mash for fermentation in a tank. The process 100 may use a common strain of microorganism, such as *Saccharomyces cerevisiae* to convert the simple sugars (i.e., maltose and glucose) into alcohol with solids and liquids, carbon dioxide ($CO_2$), and heat. The process 100 may use a residence time in fermentation 110 as long as about 50 to about 60 hours. However, variables such as a microorganism strain being used, a rate of enzyme addition, a temperature for fermentation, a targeted alcohol concentration, and the like, may affect fermentation time. In various embodiments, one or more fermentation tanks may be used in the process 100.

The process 100 creates alcohol, solids, liquids, microorganisms, and various particles through fermentation 110. Once completed, the mash is commonly referred to as beer, which may contain about 10% to about 20% alcohol, plus soluble and insoluble solids from the grain components, microorganism metabolites, and microorganism bodies. The microorganism may be recycled in a microorganism recycling step, which is an option. The part of the process 100 that occurs prior to distillation 112 may be referred to as the "front end," and the part of the process 100 that occurs after distillation 112 may be referred to as the "back end."

Turning to distillation 112, the process 100 distills the beer to separate the alcohol from the non-fermentable components, solids, and the liquids by using a distillation process, which may include one or more distillation columns, work with beer columns, side stripper, and the like.

The process 100 pumps the beer through distillation 112, which is boiled to vaporize the alcohol or produce concentrated stillage. The process 100 condenses the alcohol vapor in distillation 112 where liquid alcohol exits through a top portion of the distillation 112 at about 90% to about 95% purity ethanol, 5% water which is about 190 proof. In embodiments, the distillation columns and/or beer columns may be in series or in parallel. As described further herein, the heated vapor is typically routed through an evaporative cooling tower, which removes heat from the heated vapor with the evaporation of water. A significant amount of water is routed through the evaporative cooling tower, and the excess heat is typically exhausted through the evaporative cooling tower and wasted to the environment. In this regard, by reducing an evaporative load on the evaporative cooling tower, an amount of water used in the cooling tower, and wasted to the environment as cooling tower discharge, can be greatly reduced, in accordance with various embodiments.

In various embodiments, to provide heat during pre-fermentation (e.g., any of slurry 104, liquefaction 106, and/or SMS 108) and during distillation 112, one or more boilers 111 are used to create a low-pressure steam. The one or more boilers 111 are configured to boil water that is pumped into the boiler by heating the water until the water becomes dry steam. Once the one or more boilers 111 generate the dry steam, the dry steam is routed to one or more pre-fermentation devices 109 (e.g., a jet cooker, one or more liquefaction tanks, a selective milling system ("SMS") 108, or the like) and the distillation device (e.g., distillation device 210 from FIG. 2 and described further herein) for distillation 112. As described further herein, a super-heated fluid can be routed to the one or more boilers 111 to generate steam for use in during pre-distillation process and/or during distillation 112, or water can be routed through a condenser to boil the water and generate the steam, in accordance with various embodiments. In this regard, burning fossil fuels to generate steam for use in fermentation and/or distillation 112 can be reduced or eliminated, in accordance with various embodiments.

In various embodiments, the one or more boilers 111 can further route steam to a turbine 150 to power the turbine 150 and/or the one or more evaporators 128 (e.g., to boil away liquid from a fractionated stillage 124 as described further herein). In this regard, in response to steam being generated from the one or more boilers 111 and provided to the turbine 150, the turbine 150 can be configured to rotate, which can cause a generator to rotate to generate electricity. In this regard, the electricity can be routed to one or more electrically powered components (e.g., electrical component 152). For example, the electrical component 152 can comprise motors for pumps (e.g., used in the process 100 for pumping a process stream or other liquid used in a sub-process), agitators, fans, electric heaters (i.e., for induction heating), grinders to grind distilled grains, resistance heaters for dryers, or the like. The present disclosure is not limited in this regard, and the electrical component 152 can comprise any electrically powered component within a production plant and would still be within the scope of this disclosure. Similarly, the turbine 150 can be used to generate electricity to power a plurality of electrical components 152 throughout the production plant, in accordance with various embodiments.

In various embodiments, the one or more boilers 111 can further route steam to the one or more evaporators 128. In this regard, steam generated from the one or more boilers 111 can be utilized by the one or more evaporators 128 to boil away liquid from a fractionated stillage 124 as described further herein, in accordance with various embodiments.

In various embodiments, the one or more boilers 111 can further route steam to a distillation device at the distillation 112. In this regard, the steam generated from the one or more boilers 111 can be passed through the process stream, whereby the steam volatile compounds are volatized, condensed, and collected in receivers, in accordance with various embodiments. Although illustrated as routing steam from the one or more boilers 111, the present disclosure is not limited in this regard. For example, other types of distillation devices that don't utilize steam are within the scope of this disclosure, such as a rectifier tower or a vacuum distillation device, in accordance with various embodiments.

At dehydration 114, the process 100 removes any moisture from the 190 proof alcohol by going through dehydration. The dehydration 114 may include one or more drying column(s) packed with molecular sieve media to yield a product of nearly 100% alcohol, which is 200 proof alcohol.

At the holding tank 116, the process 100 adds a denaturant to the alcohol. Thus, the alcohol is not meant for drinking, but to be used for motor fuel purposes. At 118, an example product that may be produced is ethanol, to be used as fuel or fuel additive for motor fuel purposes.

Turning back to distillation 112, the water-rich product output from the distillation device that is remaining is now referred to as a defiber process stream 120, which may include but is not limited to, starches, soluble organic and inorganic compounds, suspended solids containing protein, carbohydrate, dissolved solids, water, oil, fat, protein, minerals, acids, bases, recycled yeast, non-fermented carbohydrates, by-products, small amount of fiber, and the like. Defiber is defined as having a minimum or small amount of fiber. The defiber process stream 120 falls to the bottom of the distillation 112 and passes through a feed optimization technology ("FOT") 122 process to create a high protein feed product. Stated another way, the defiber process stream 120 is enriched in protein via FOT 122.

The process in FOT 122 may be included with any process as part of the dry grind process or any type of process, steep process, or wet milling in a production facility. Specifically, FOT 122 helps to create a high protein animal feed product and other products that may be sold.

The liquid stream 122B from FOT 122 may need further processing due to its total solids composition. For example, the liquid stream 122B could contain high amounts of suspended solids that may cause efficiency problems in the evaporators. Furthermore, this processing step of evaporating to concentrate solids in high water content streams utilizes a significant amount of energy. Thus, the amount of energy can increase the operating costs. The evaporator capacity may be a bottleneck in the plant. The process 100 sends this liquid stream 122B to fractionated stillage 124 for further processing.

Fractionated stillage 124 may be included with any process as part of the dry grind process or any type of process in a production facility. Specifically, fractionated stillage 124 helps to improve the separation of solids from liquids in an efficient manner, improve evaporator operation, increase throughput, provide feed streams for further processing to produce valuable animal feed products and/or oil, and to reduce GHG or carbon emissions. Other embodiments may include fractionated stillage 124 processes being located after whole stillage or after any of the evaporators (i.e., after one, two, three, last, and the like).

The process 100 sends a liquid stream from fractionated stillage 124 to the one or more evaporators 128 to boil away liquids from this stream. This creates a thick syrup, condensed distillers solubles, CDS 130 (i.e., about 25% to about 50% dry solids), which contains soluble or dissolved solids, suspended solids (generally less than 50 μm), and buoyant suspended solids from fermentation. As described further herein, each of the one or more evaporators 128 can be configured to receive a super-heated air from a system configured to recycle energy produced from distillation 112. The super-heated air can evaporate a liquid (e.g., water), and the evaporated liquid (e.g., steam) can drive the one or more evaporators 128 as described further herein. In this regard, fossil fuels, which are typically utilized to generate steam for evaporators, can be eliminated, in accordance with various embodiments.

The one or more evaporators 128 may represent multiple effect evaporators, such as any number of evaporators, from one to about twelve evaporators. Some process streams may go through a first effect evaporator of the one or more evaporators 128, which includes one to four evaporators and operates at higher temperatures, such as ranging to about 210° F. (about 99° C. or about 372 K). While other process streams may go through a second effect evaporator of the one or more evaporators 128, which operates at slightly lower temperatures than the first effect evaporator of the one or more evaporators 128, such as ranging from about 130° F. to about 188° F. (about 54° C. to about 87° C. or about 328 K to about 360 K). The second effect evaporator of the one or more evaporators 128 may use heated vapor from the first effect evaporator of the one or more evaporators 128 as heat or use recycled steam. In various embodiments, there may be three or four effect evaporators, which operate at lower temperatures than the second effect evaporator. In various embodiments, the multiple effect evaporators may range from one effect up to ten effects or more. This depends on the plants, the streams being heated, the materials, and the like. In various embodiments, the evaporators may be in series or in parallel.

The process 100 sends the CDS 130 (AAFCO 2017 Official Publication at 27.7) from the one or more evaporators 128 to become combined with the fiber 109 (AAFCO 2017 Official Publication at 48.2) from SMS 108 to produce fiber & CDS 132 as a product. This may also be referred to as a fiber & syrup product.

In various embodiments, the process 100 can send the syrup, which is concentrated having about 20% to about 45% by weight of total solids, to be sold as CDS 130 (AAFCO 2017 Official Publication at 27.7). This may be sold at a very low price. The CDS 130 may contain fermentation by-products, moderate amounts of fat, spent yeast cells, phosphorus, potassium, sulfur, and other nutrients. The moisture content for the CDS 130 may range from about 55% to about 80%.

In various embodiments, the process 100 may send a stream from the one or more evaporators 128 to a process for oil recovery 134, which removes oil from fractionated stillage 124 to recover oil. As a result, the process 100 produces a product of oil 136 of back-end oil and solids. The process 100 may send solids, water, and the like from the oil recovery 134 back to the one or more evaporators 128 for further processing, in accordance with various embodiments.

Returning to FOT 122, the process sends a cake stream 122A to the one or more dryers 138. The one or more dryers 138 are dryers for removing moisture from the feed products. The one or more dryers 138 may include one or multiple dryers, which are not limited to, a rotary drum dryer (e.g., with a motor as the electrical component 152), a steam tube dryer (e.g., provided with steam generated from the one or more boilers 111), a scrape surface rotary contact dryer, a flash dryer, a ring dryer, a thin film steam dryer (e.g., provided with steam generated from the one or more boilers 111), a spray dryer, a freeze dryer, and the like. In various embodiments, as described further herein, the one or more dryers 138 are configured to receive a super-heated air produced from a fin-fan heat exchanger by utilizing excess heat from heated vapor from the distillation 112. In this regard, utilization of fossil fuels to power the one or more dryers 138 can be eliminated, in accordance with various embodiments.

The process 100 dries these materials via the one or more dryers 138 to create a very high protein product, Hi-Pro 140 having protein content ranging from approximately 46% to approximately 64% dry basis. The process 100 may receive a yeast enriched stream 126 from the fractionated stillage 124 to be combined with material from FOT 122 to create an Enrich Yeast Hi-Pro 144, which is dried animal feed product, that is yeast enriched and has high protein over 46%. The yeast may be approximately 25% based on mass balance calculations. The process 100 also blends fiber and syrup from SMS 108 and some very high protein from Hi-Pro 140 together to achieve 26% protein content for DDG 142. The process 100 combines individual ingredients of fiber 109 from SMS 108, CDS 130 from the one or more evaporators 128, high protein feed product (e.g., Hi-Pro 140) from FOT 122 and yeast enriched stream 126 from the fractionated stillage 124 to create DDGS 146.

In various embodiments, the process 100 further comprises exhausting a fluid (e.g., carbon monoxide) from the one or more dryers 138 through a thermal oxidizer 160. In various embodiments, the thermal oxidizer can be regenerative or a conventional thermal oxidizer. The present disclosure is not limited in this regard. The thermal oxidizer 160 can be configured to destroy hazardous air pollutants (HAP), volatile organic compounds (VOC), odorous emissions created during the process 100, or the like. In this regard, carbon dioxide can be exhausted to the atmosphere as opposed to carbon monoxide, which can have various environmental benefits, in accordance with various embodiments. In various embodiments, the thermal oxidizer 160 can be configured to increase a heat of the fluid from approximately 200° F. (93° C.) to between 250° F. (121° C.) and 700° F. (371° C.) for a regenerative thermal oxidizer, to between 250° F. (121° C.) and 1,500° F. (816° C.). In various embodiments, the thermal oxidizer 160 outputs an exhaust fluid through an exhaust 162 of the production plant (e.g., production plant 205 as described further herein). In various embodiments, excess heat generated from the thermal oxidizer 160 can be utilized with a heat pump (e.g., heat pump 405, heat pump 505, or the like) to cycle up a temperature of a refrigerant, as described further herein.

Figure 2:
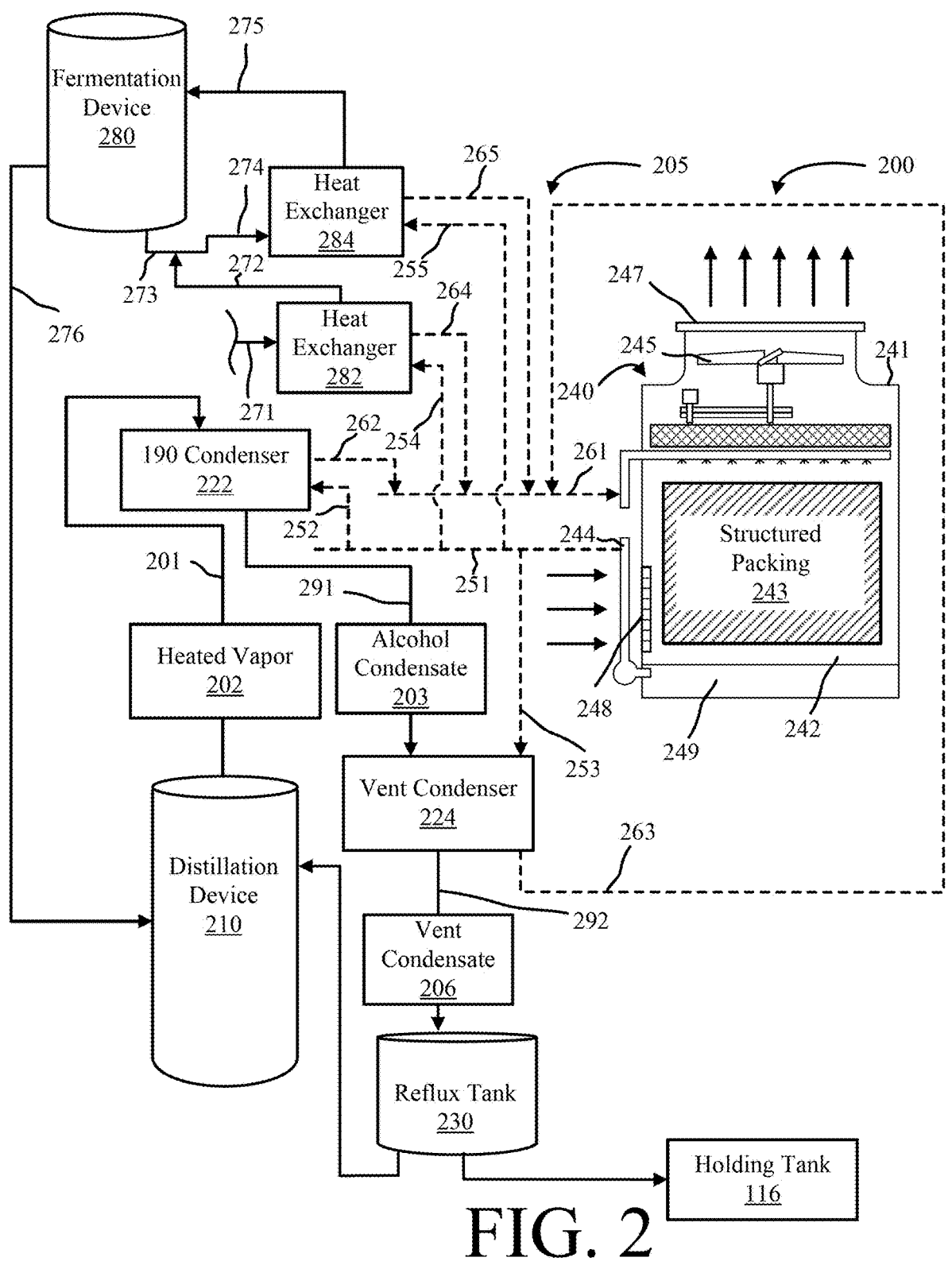
FIG. 2 illustrates a schematic view of a system for use in the process of FIG. 1 in a production plant, in accordance with various embodiments.

Referring now to FIG. 2, a system 200 in a production plant 205 for producing ethanol 118 in process 100 from FIG. 1 is illustrated prior to a retrofitting process (e.g., retrofitting process 1200 from FIG. 12 or retrofitting process 1300 from FIG. 13), in accordance with various embodiments. The system 200 includes a distillation device 210 (e.g., a rectifier tower, a steam distillation device, a vacuum distillation device, or the like), an evaporative cooling tower 240, a reflux tank 230, and a holding tank 116. In various embodiments, the distillation device 210 is a rectifier tower. In various embodiments, the distillation device 210 receives an overhead vapor from the beer mash from the fermentation 110 in process 100 from FIG. 1. The distillation device 210 concentrates the ethanol up to about 190 proof. "About 190 proof" as referred to herein includes between 185 proof and 195 proof, or between 188 proof and 192 proof. In various embodiments, the distillation device 210 can remove a small amount of heavier alcohols (e.g., propanol or the like) in a side stream or from a bottom of the distillation device 210. The present disclosure is not limited in this regard.

In various embodiments, a heated vapor 202 is generated from the distillation device 210. In various embodiments, the heated vapor 202 can be about 190 proof and between 120° F. (49° C.) and 150° F. (66° C.), or approximately 135° F. (57° C.). The heated vapor 202 is routed through a fluid line 201 from an outlet of the distillation device 210 to a condenser 222 (e.g., a 190 condenser). The condenser 222 is configured to receive the heated vapor 202 and reduce the heated vapor 202 to a liquid form (e.g., alcohol condensate 203) that is output to the vent condenser 224. The vent condenser 224 is configured to recover chemicals that may be present in the alcohol condensate 203, to ensure that the condensate (e.g., the vent condensate 206) that is received by the reflux tank 230 is not pressurized, or the like. Stated another way, the heated vapor 202 is received by the condenser 222 via the fluid line 201, cooled by the condenser 222 and output from the fluid line 291 to a vent condenser 224, and then routed from the vent condenser 224 to the reflux tank 230 via a fluid line 292. The fluid lines 201, 291, 292 can each comprise one or more tube assemblies. For example, the fluid line 201 can comprise a single tube assembly that extends from the distillation device 210 to the condenser 222 or multiple tube assemblies coupled via pipe fittings, couplings, or the like. The present disclosure is not limited in this regard. A cross-sectional profile of the one or more tube assemblies can be round or non-round. The present disclosure is not limited in this regard.

In various embodiments, the reflux tank 230 is configured to further condense the vent condensate 206 received from the vent condenser 224 and send back a high concentration of the vent condensate 206 to the distillation device 210. In various embodiments, the return of the reflux can be configured to enrich the material (i.e., liquid and vapor) in the distillation device 210 by displacing the higher nonalcoholic content at the lower levels of the distillation device 210. In this regard, the heat needed at the top of the distillation device 210 to create additional phase change cycles will be somewhat reduced compared to the heat entering the base of the distillation device where the alcohol by volume is less enriched. Accordingly, a higher alcohol by volume at the top of the distillation device 210 and a graduation of lower alcohol by volume down a length of the distillation device 210 can be generated. In various embodiments, a portion of ethanol is output from the reflux tank 230 and sent to the holding tank 116 for storage.

In various embodiments, the distillation device 210 is configured to receive a fermented process stream (e.g., via fluid line 276) from a fermentation device 280 (e.g., a fermentation tank, a closed fermenter, or any fermentation device known in the art).

In various embodiments, the evaporative cooling tower 240 is an open circuit evaporative cooling tower. In this regard, the evaporative cooling tower 240 can comprise a housing 241 defining a cavity 242 therein, a fluid circuit 244, a fan 245, an air inlet 248, an exhaust outlet 247, and a water supply 249. However, although illustrated as an open circuit evaporative cooling tower, the present disclosure is not limited in this regard. For example, the structured packing 243 of the evaporative cooling tower 240 could be replaced with a secondary circuit (e.g., in addition to the fluid circuit 244) to facilitate heat transfer within the cavity 242 of the housing 241 and still be within the scope of this disclosure. Similarly, although illustrated in an induced draft configuration (e.g., the fan 245 disposed proximate the exhaust outlet), the present disclosure is not limited in this regard. For example, the evaporative cooling tower 240 could include a forced draft configuration with the fan 245 disposed proximate the air inlet 248 and still be within the scope of this disclosure.

In various embodiments, the evaporative cooling tower 240 is configured to continuously supply water from a water supply 249 through the fluid circuit 244 and into the cavity 242 of the housing 241. In various embodiments, water that travels through the fluid circuit 244 is heated as described further herein. In this regard, water output from the fluid circuit 244 on a top side of the cavity 242 is heated relative to the water supplied from the water supply 249. This heated water is then cooled by the structured packing 243 and supplied back to the water supply 249 at a bottom side of the cavity 242. Stated another way, the structured packing 243 can be configured to facilitate evaporation of the water received in the cavity 242 that has been routed through the condenser 222 and/or the vent condenser 224. Simultaneously with water flowing through the fluid circuit 244, air (e.g., ambient air) is pulled (or pushed) through the cavity 242 and a warm, moist air is output through the exhaust outlet 247 of the evaporative cooling tower 240. Stated another way, a portion of the water that is output on the top side of the cavity 242 of the evaporative cooling tower 240 evaporates and travels out the exhaust outlet 247 of the evaporative cooling tower 240, in accordance with various embodiments.

In various embodiments, the fluid circuit 244 comprises a common supply header 251 extending from the water supply 249 to supply lines for one or more heat exchangers (e.g., condensers 222, 224), and a common return header 261 extending from one or more return lines for the one or more heat exchanger (e.g., condensers 222, 224) into a top side of the cavity 242. In various embodiments, the common return header 261 comprises a plurality of outlets spaced apart longitudinally along at least a portion of the common return header 261 and within the cavity 242. In this regard, the water that is returned to the evaporative cooling tower 240 through the common return header 261 can be output through the plurality of outlets at a top side of the cavity 242, cooled via the structured packing 243, and returned to the water supply 249 in a cooled state, in accordance with various embodiments.

In various embodiments, the fluid circuit 244 further comprises input lines (e.g., fluid lines 252, 253, 254, 255) and output lines (e.g., fluid lines 262, 263, 264, 265), which can define sub-circuits from and back to the evaporative cooling tower. Each of the input lines (e.g., fluid lines 252, 253, 254, 255) can route water from the water supply 249 of the evaporative cooling tower 240 to a respective heat exchanger (e.g., fluid line 252 routes water into the condenser 222, fluid line 253 routes water into the vent condenser 224, fluid line 254 routes water into a heat exchanger 282, fluid line 255 routes water into a heat exchanger 284). Similarly, each of the output lines (e.g., fluid lines 262, 263, 264, 265) can route water from an outlet of a respective heat exchanger (e.g., fluid line 262 can route water from an outlet of condenser 222, fluid line 263 can route water from an outlet of vent condenser 224, fluid line 264 can route water from an outlet of heat exchanger 282, fluid line 265 can route water from an outlet of heat exchanger 284) back to the common return header 261. Although illustrated as including the heat exchanger 284, the present disclosure is not limited in this regard. For example, in various embodiments, a beer mash that is output from the fermentation device 280 can be merged with an output of the heat exchanger 282 and directly recycled into the fermentation device 280 without traversing through a heat exchanger 284 and still be within the scope of this disclosure.

In this regard, water supplied from the water supply 249 is routed into the condenser 222 via the fluid line 252, through the condenser 222 to facilitate condensing the heated vapor 202 received from the distillation device 210, out the fluid line 262, and into the cavity 242 of the evaporative cooling tower 240 via the common return header 261 to be evaporated out and/or partially cooled by the evaporative cooling tower 240. Similarly, water supplied from the water supply 249 is also routed into the vent condenser 224 via the fluid line 253, through the vent condenser 224 to facilitate condensing the alcohol condensate 203 received from the condenser 222, out the fluid line 263, and into the cavity 242 of the evaporative cooling tower 240 via the common return header 261 to be evaporated out and/or partially cooled by the evaporative cooling tower 240, in accordance with various embodiments. Although illustrated as including common headers 251, 261, the present disclosure is not limited in this regard. For example, the system 200 can have the condenser 222 and the vent condenser 224 fluidly coupled to the water supply 249 in series (as opposed to parallel) and still be within the scope of this disclosure.

Although the fluid line 252 routing water from the evaporative cooling tower 240 through the 190 condenser 222 is illustrated as being routed from the common supply header 251, the present disclosure is not limited in this regard. For example, the fluid line 252 could be routed from the common return header 261 in order to utilize a water that is a higher temperature relative to the common supply header 251 and still be within the scope of this disclosure, in accordance with various embodiments.

In various embodiments, the heat exchanger 282 is further configured to receive a hot mash (e.g., via a fluid line 271 and from SMS 108 of process 100 in FIG. 1) and output a cooler mash relative to the hot mash received (e.g., via fluid line 272). In this regard, water supplied from the water supply 249 is routed into the heat exchanger 282 via the fluid line 254, through the heat exchanger 282 to facilitate cooling of the hot mash that is output as cooler mash through the fluid line 272, out the fluid line 264, and into the cavity 242 of the evaporative cooling tower 240 via the common return header 261.

In various embodiments, the fluid line 272 feeds an output of beer mash from the heat exchanger 282 into a fluid line 274 that may intersect a fluid line 273 that is output from the fermentation device 280 (e.g., a bottom side) and extending into the heat exchanger 284. In this regard, a beer mash that is output from the heat exchanger 282 may be further cooled prior to being supplied to the fermentation device 280. In this regard, the heat exchanger 284 is configured to receive a combined stream from the fermentation device 280 (e.g., a beer mash that is output from the fermentation device 280 via fluid line 273) and the heat exchanger 282 via a fluid line 274. The heat exchanger 284 is configured to further reduce a temperature of the combined stream prior to supplying the beer mash to the fermentation device 280 (e.g., via fluid line 275). For example, water supplied from the water supply 249 is routed into the heat exchanger 284 via the fluid line

255, through the heat exchanger 284 to facilitate further cooling of the beer mash, out the fluid line 264, and into the cavity 242 of the evaporative cooling tower 240 via the common return header 261. After the beer mash is supplied to the fermentation device 280 and fermented, the fermentation device 280 is further configured to output the fermented stream to the distillation device 210 via fluid line 276 as described previously herein.

In various embodiments, by traversing the water of the water supply 249 through the condenser 222 and the vent condenser 224, the water that is output to the common return header 261 is heated. In the production plant 205, the excess energy that is generated by heating the water that travels through the condensers 222, 224 is wasted to the atmosphere by the evaporative cooling tower 240. Stated another way, excess heat produced by the distillation device 210 is wasted to the atmosphere by the evaporative cooling tower 240 in the production plant 205.

Figure 3A:
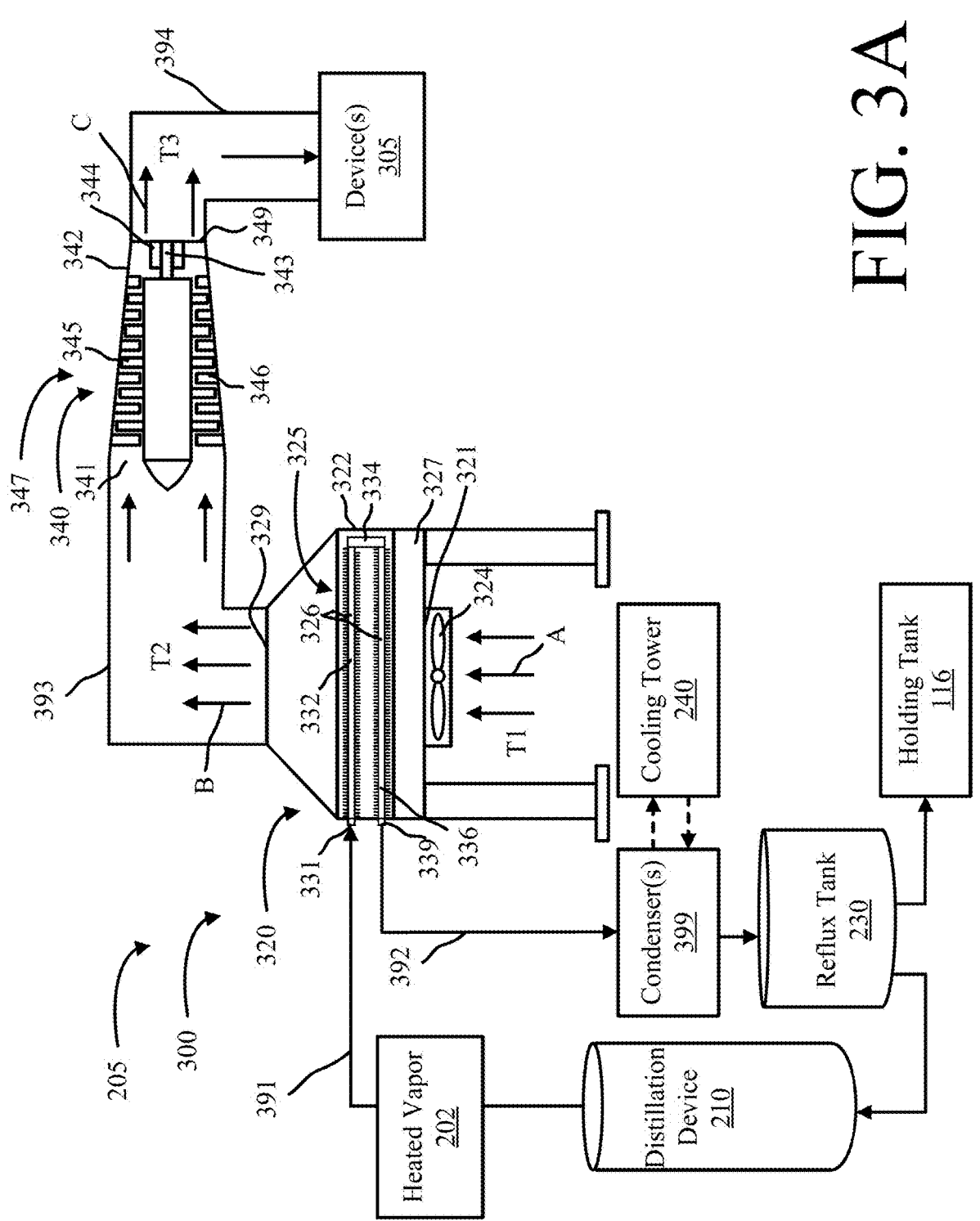
FIG. 3A illustrates a system for recycling energy in a production plant, in accordance with various embodiments.
Figure 4:
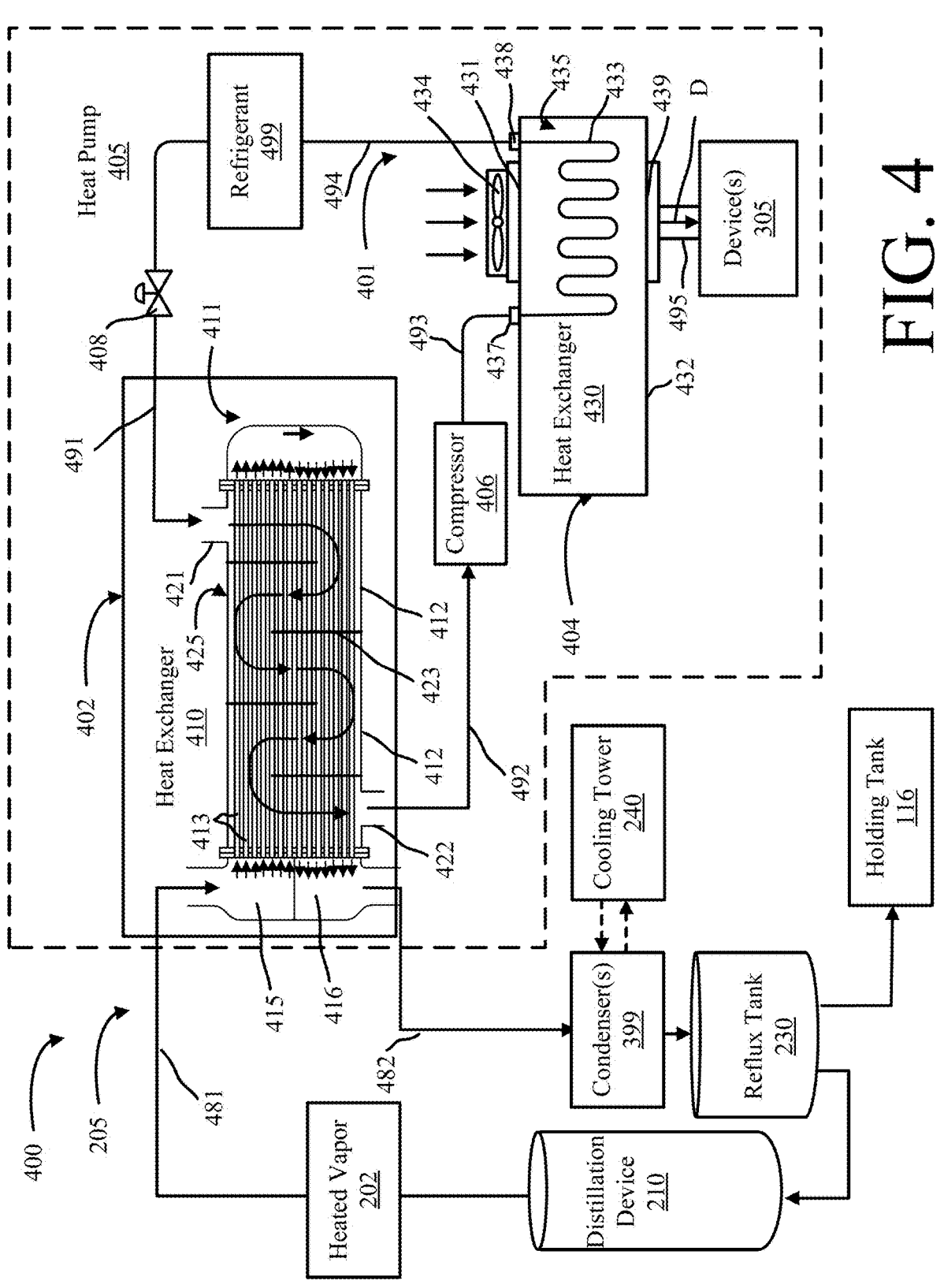
FIG. 4 illustrates a system for recycling energy in a production plant, in accordance with various embodiments.
Figure 5:
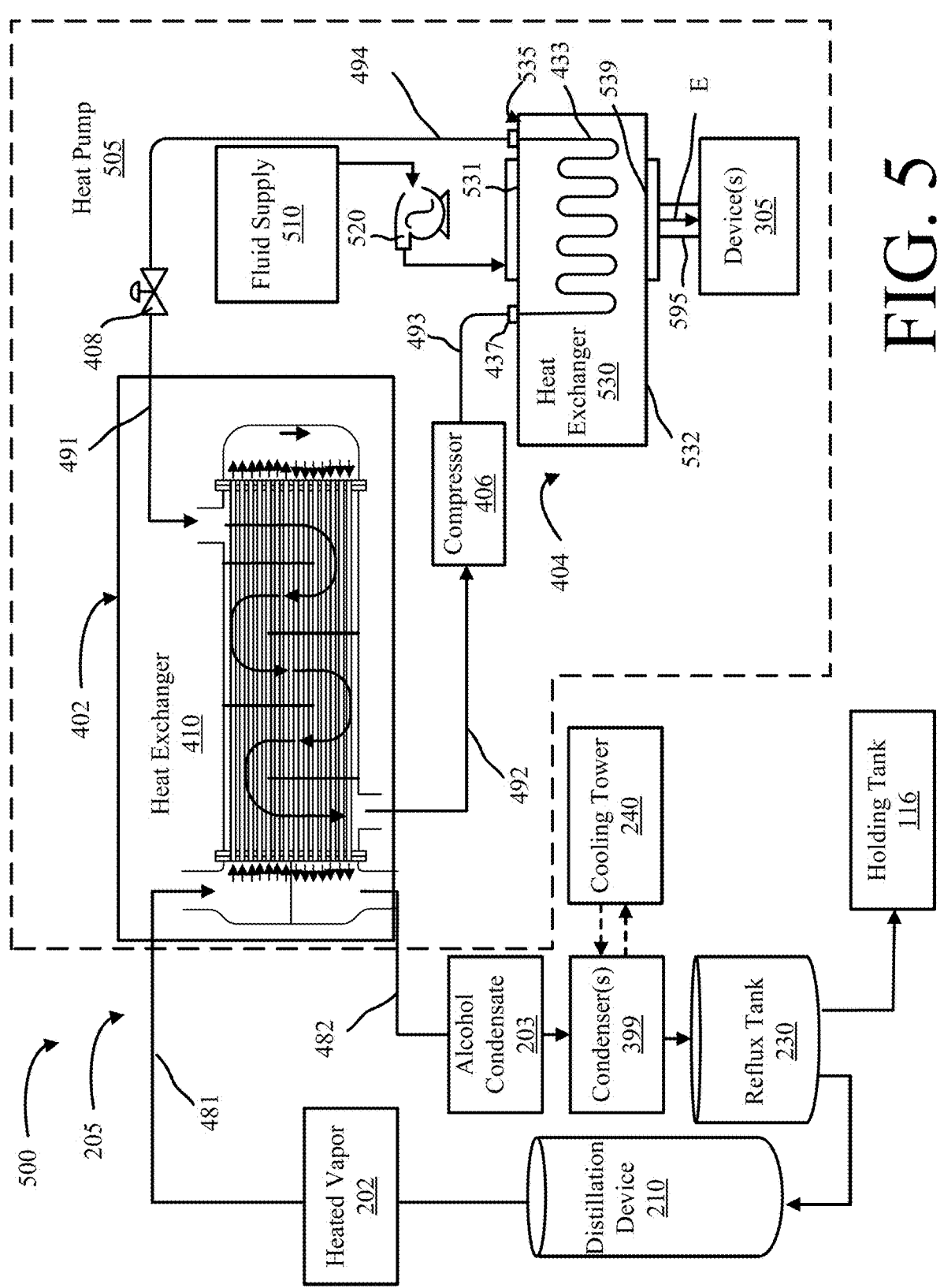
FIG. 5 illustrates a system for recycling energy in a production plant, in accordance with various embodiments.
Figure 6:
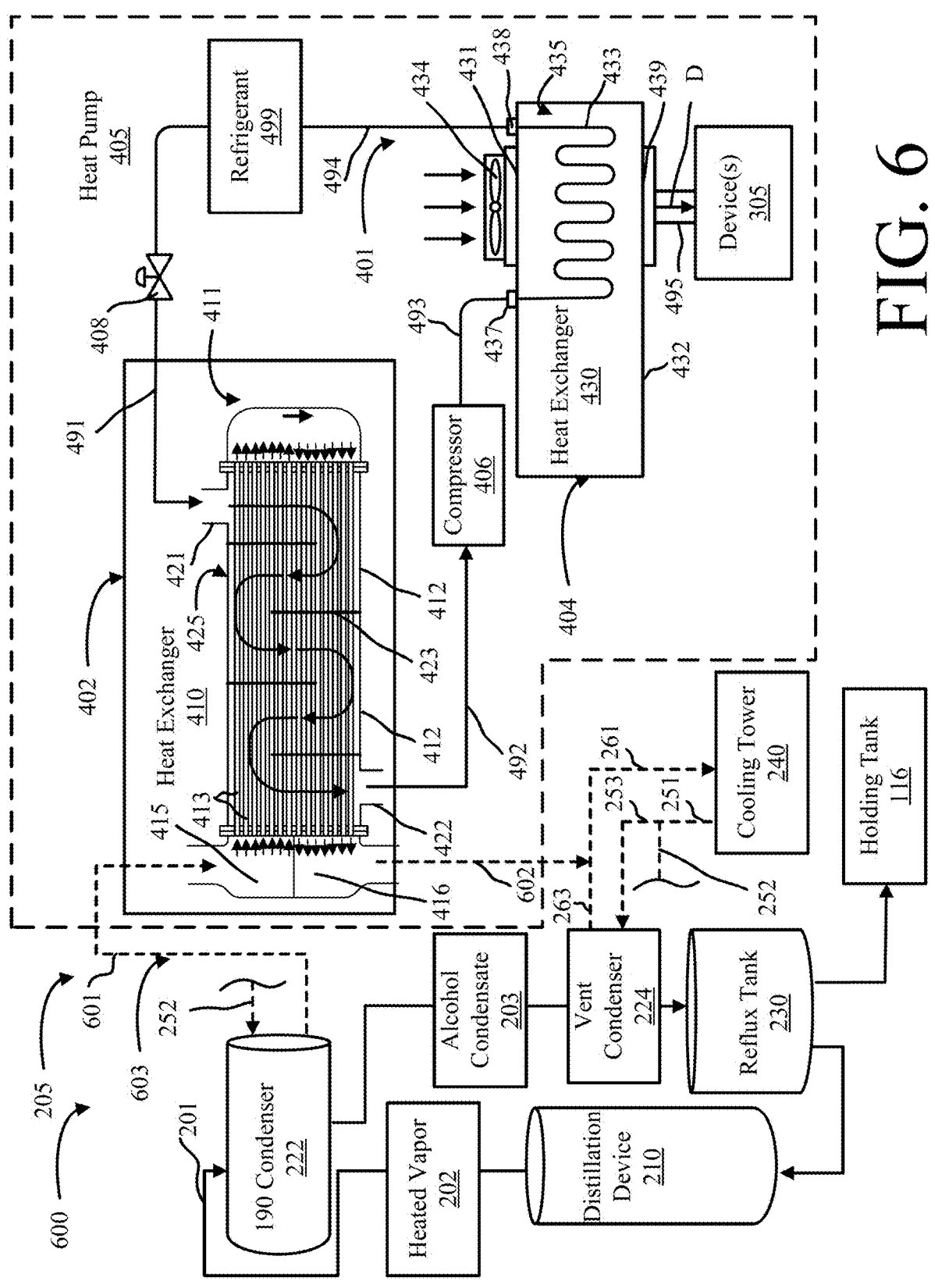
FIG. 6 illustrates a system for recycling energy in a production plant, in accordance with various embodiments.
Figure 7:
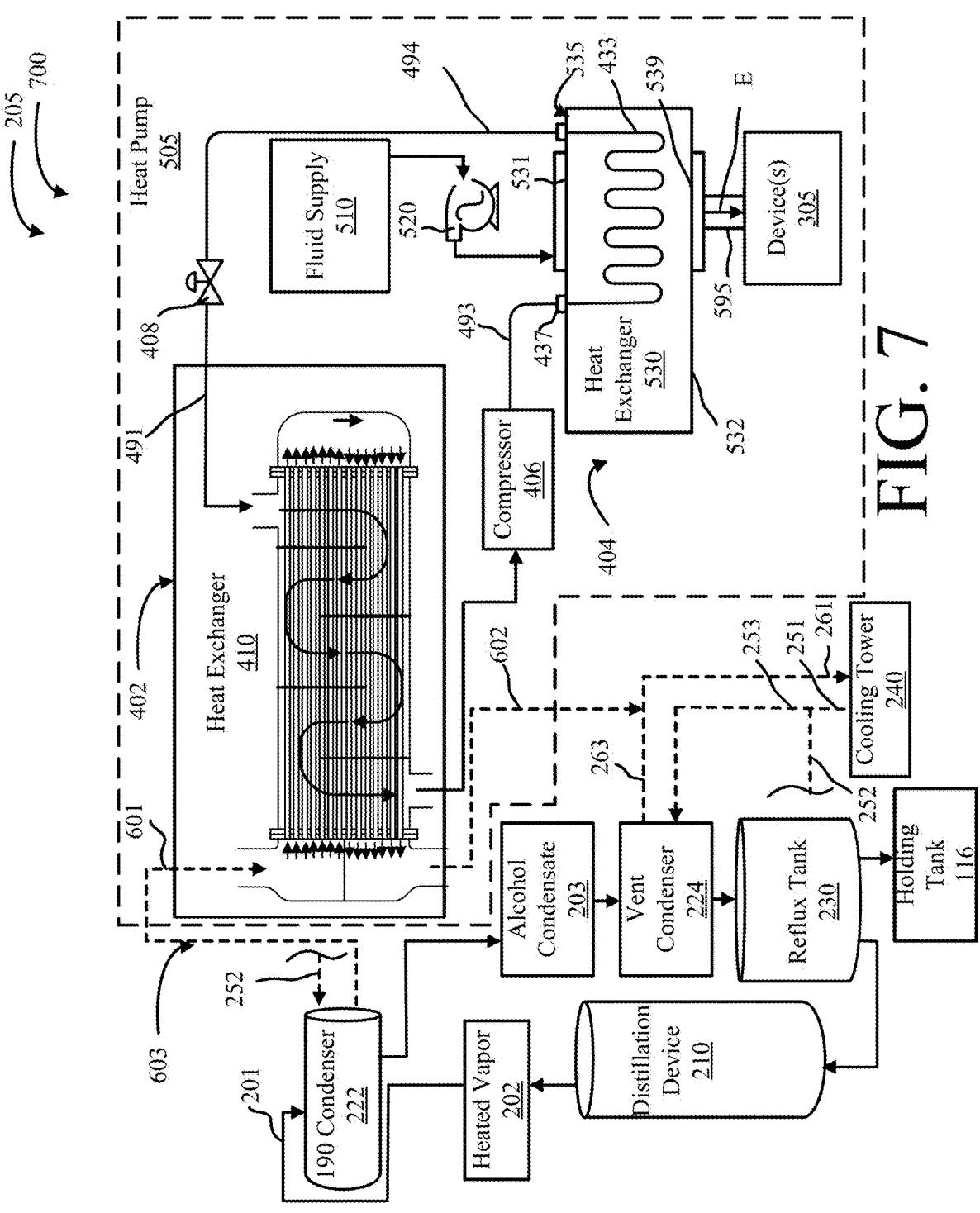
FIG. 7 illustrates a system for recycling energy in a production plant, in accordance with various embodiments.

In various embodiments, by replacing the system 200 with a system 300 from FIG. 3A, a system 400 from FIG. 4, a system 500 from FIG. 5, a system 600 from FIG. 6, or a system 700 from FIG. 7, a significant reduction in water usage can be realized. For example, in accordance with various embodiments, by retrofitting the system 200 with a system 300, 400, 500, 600, 700 as described further herein, approximately 235 gallon/minute of water savings can be realized. For production plants that have a production limitation due to water restrictions, retrofitting the system 200 with a system 300, 400, 500, 600, 700 as described further herein can allow for increased production. For example, for those plants that are running 130 million gallons per year, the plant would be able to run over 200 million gallons per year of ethanol in response to retrofitting the system 200 with a system 300, 400, 500, 600, 700. In addition, for plants that have to be zero water discharge, the production plants typically re-use less desirable water within the plant. By retrofitting the system 200 with system 300, 400, 500, 600, 700, the system 300, 400, 500, 600, 700 can allow for less of that water to be reused/evaporated, in accordance with various embodiments.

A significant reduction in natural gas consumption can also be achieved by the system 300, 400, 500, 600, 700 in accordance with various embodiments. For example, by retrofitting the system 200 with a system 300, 400, 500, 600, 700 as described further herein, a natural gas consumption in the process 100 from FIG. 1 can be reduced by as much as two-thirds. Stated another way, in terms of efficiency, by retrofitting the system 200 with a system 300, 400, 500, 600, 700, it would be comparable to taking a 20 gallons per mile car and retrofitting the car with a system that allows the car to run at 60 gallons per mile. Although described further herein with various retrofitting processes, the present disclosure is not limited in this regard. For example, the system 300, 400, 500, 600, 700 can be a part of a new build production plant and still be within the scope of this disclosure. The retrofitting processes are provided herein to illustrate how the system 300, 400, 500, 600, 700 can be retrofitted into existing plants and facilitate significant water savings and/or significant reduction in natural gas consumption without having to build a new production plant from scratch, in accordance with various embodiments.

Referring now to FIG. 3A, a system 300 for recycling energy in a production plant 205 (e.g., a production plant configured to perform the process 100 from FIG. 1) is illustrated in accordance with various embodiments. As described further herein, the system 300 can be retrofitted into the system 200 from FIG. 2 as described in the retrofitting process 1200 from FIG. 12. The system 300 is configured to recycle energy that is output form the distillation device 210 back into the production plant 205. Stated another way, instead of wasting excess heat that is generated from the distillation device 210 into the atmosphere, the system 300 utilizes that heat from the heated vapor 202 that is generated from the distillation device 210 to heat air, then further heats the heated air to form super-heated air, and finally utilizes the super-heated air within other devices in the production plant 205 to replace gas-powered devices (e.g., a gas-powered boiler, a gas-powered dryer, a gas powered evaporator, or the like). In various embodiments, the super-heated air generated from the system 300 can be further utilized to generate electricity (e.g., by forming steam with the super-heated air and/or powering a steam-powered turbine with a generator).

The system 300 comprises a distillation device 210, a fin-fan heat exchanger 320, a compressor 340, and one or more devices 305. In various embodiments, the one or more devices 305 are pre-existing devices in the production plant 205 prior to the retrofitting process 1200 from FIG. 12. For example, as described further herein, the one or more devices 305 can comprise the one or more dryers 138 from FIG. 1, the one or more evaporators 128 from FIG. 1, the dryer 102 configured for pre-heating the feedstock 101 from FIG. 1, the boiler 111 from FIG. 1, or the like as described further herein.

The distillation device 210 is the distillation device 210 from system 200 from FIG. 2. Stated another way, the fin-fan heat exchanger 320 and the compressor 340 can be retrofitted into the production plant 205 and maintain existing devices, such as the distillation device 210 and the one or more devices 305 as described further herein. In various embodiments, the one or more devices 305 can be new devices that replace existing devices in the production plant 205. The present disclosure is not limited in this regard.

In various embodiments, the distillation device 210 comprises a rectifier tower. However, the present disclosure is not limited in this regard. For example, the distillation device 210 can comprise a steam distillation device, a vacuum distillation device or any other distillation device known in the art.

In various embodiments, the system 300 can further comprise one or more condensers 399 (e.g., at least one of the condensers 222, 224 from the system 200 from FIG. 2). In this regard, the fin-fan heat exchanger 320 can be disposed fluidly between the distillation device 210 and the one or more condensers 399. The each of the one or more condensers 399 can be re-configured to condense any of the heated vapor 202 that is not fully condensed from the fin-fan heat exchanger 320.

In various embodiments, the fin-fan heat exchanger 320 can replace the condenser 222 and the vent condenser 224. In various embodiments, the fin-fan heat exchanger 320 can replace one of the condenser 222 and the vent condenser 224. In various embodiments, the one or more condensers 399 comprises both the condenser 222 and the vent condenser 224. For example, by keeping both the condenser 222 and the vent condenser 224, the system 300 can operate more efficiently by optimizing the fin-fan heat exchanger 320 for heating the air utilized by the one or more devices 305 that are downstream from the fin-fan heat exchanger 320, as opposed to balancing heat transfer for condensing of the heated vapor 202 and heating of the air for the one or more devices 305. Similarly, as the condensers 222, 224 are existing components within the production plant 205 prior to a retrofitting process, re-configuring the condensers 222, 224 for use in the system 300 can reduce retrofitting costs and facilitate optimization of the ethanol production process with the system 300, in accordance with various embodiments.

In various embodiments, the fin-fan heat exchanger 320 is configured to receive the heated vapor 202 from the distillation device 210, as well as a fluid (e.g., air pulled through the fin-fan heat exchanger) in a heat transfer region 325. In various embodiments, the fin-fan heat exchanger 320 is further configured to condense the heated vapor 202 and heat the fluid (e.g., air) to form a heated fluid (e.g., heated air).

The compressor 340 is fluidly coupled to the fin-fan heat exchanger 320. The compressor 340 is configured to receive the heated fluid from the fin-fan heat exchanger 320 and output a super-heated fluid. The super-heated fluid that is output from the compressor 340 can have a temperature that is at least double the heated fluid as described further herein. The compressor 340 is fluidly coupled to one or more devices 305 in the production plant 205. In this regard, the one or more devices 305 in the production plant 205 is configured to receive the super-heated fluid and/or to utilize the super-heated fluid for operation, in accordance with various embodiments.

The fin-fan heat exchanger 320 comprises a housing 322, a fan 324 coupled to the housing 322, and a bundle of finned tubes 326 routed through the housing 322. The bundle of finned tubes 326 can comprise a bundle of inlet tubes 332 extending from an inlet 331 (e.g., an inlet plenum or the like) to a return header 334 and return through a bundle of outlet tubes 336 from the return header 334. Although illustrated as a supply finned tube and a return finned tube, the present disclosure is not limited in this regard. Each of the bundle of finned tubes 326 extend from an inlet 331 (e.g., an inlet plenum or an inlet header) to a return header 334 or from the return header 334 to an outlet 339 (e.g., an outlet plenum or an outlet header). Although illustrated as being on a same side of the housing 322, the present disclosure is not limited in this regard. For example, the inlet 331 and the outlet 339 can be disposed on opposite sides of the housing 322 and still be within the scope of this disclosure. In various embodiments, a fluid (e.g., the heated vapor 202) can travel into the inlet 331, traverse through a first set of the bundle of finned tubes 326 (e.g., disposed in series, in parallel, and/or a combination of the two), traverse through the return header 334, and then traverse through a second set of the bundle of finned tubes 326 and travel out the outlet 339.

The housing 322 comprises an inlet 321 and an outlet 329. Disposed within the housing 322 is a heat transfer region 325. The heat transfer region 325 is configured to transfer heat from the heated vapor 202, that is being condensed as it travels through the bundle of finned tubes 326 disposed in the heat transfer region 325, to air that is traversing through a plenum 327 disposed in the heat transfer region 325 as described further herein. In various embodiments, the housing 322 comprises the plenum 327. In this regard, the plenum 327 can be partially defined by the housing 322, in accordance with various embodiments. In various embodiments, the fan 324 is coupled to an inlet 321 and configured in a forced draft configuration. Although illustrated in a forced draft configuration, the fin-fan heat exchanger 320 is not limited in this regard. For example, the fan 324 could be coupled proximate an outlet 329 of the housing 322 in an induced draft configuration and still be within the scope of this disclosure.

In various embodiments, each of the bundle of finned tubes 326 comprises a tube extending from a first longitudinal end to a second longitudinal end. Each of the bundle of finned tubes 326 comprises a radially inner surface defining a fluid cavity and a radially outer surface, the radially inner surface and the radially outer surface defining a tube thickness therebetween. Each of the bundle of finned tubes 326 can further comprise a plurality of fins (e.g., heat-transfer fins) extending radially outward from the radially outer surface of a respective finned tube. In this regard, each of the fins in the plurality of fins are configured to facilitate heat transfer of the heated vapor 202 traversing through the bundle of finned tubes 326 to air being pulled (or pushed) through the housing 322 of the fin-fan heat exchanger 320.

In various embodiments, the distillation device 210 is configured to generate a heated vapor 202 as described previously herein. For example, the distillation device 210 is configured to receive overhead vapor from a beer mash tower (e.g., from fermentation 110 in FIG. 1), and concentrate the ethanol up to about 190 proof (e.g., between 188 and 192 proof), which is the azeotrope. The ethanol is then released as heated vapor 202 to the bundle of finned tubes 326 of the fin-fan heat exchanger 320. The heated vapor 202 is at least partially condensed in response to traversing through the bundle of finned tubes 326 of the fin-fan heat exchanger 320. Stated another way, the bundle of finned tubes 326 of fin-fan heat exchanger 320 is configured to receive the heated vapor 202 from the distillation device 210 through an inlet 331, convert the heated vapor 202 into an alcohol condensate, and output the vent condensate out the outlet 339 of the bundle of finned tubes 326 to the vent condenser 224 or a reflux tank 230. A portion of the vent condensate is recycled into the distillation device 210 and another portion of the vent condensate is fed to a holding tank 116 for storage, as described previously herein with respect to the system 200 from FIG. 2. Although described herein as partially condensing the heated vapor 202, the present disclosure is not limited in this regard. For example, the heated vapor 202 can remain as heated vapor 202 after traversing through the fin-fan heat exchanger 320 and still be within the scope of this disclosure.

In various embodiments, the compressor 340 is an axial compressor 347. Although illustrated as an axial compressor 347, the present disclosure is not limited in this regard. For example, the compressor 340 can comprise a centrifugal compressor, a radial-axial compressor, a positive displacement compressor, a turbine, or the like and still be within the scope of this disclosure.

In various embodiments, the compressor 340 comprises a casing 342, a drive shaft 343, an electric motor 344, a plurality of rotor blades 345, and a plurality of stator vanes 346. Each of the plurality of stator vanes 346 is coupled to, and extending radially inward from, the casing 342. Each of the plurality of rotor blades 345 is coupled to, and extending radially outward from, the drive shaft 343. The plurality of stator vanes 346 and the plurality of rotor blades 345 are arranged in alternating rows of rotor blades and stator vanes. The electric motor 344 is operably coupled to the drive shaft 343. In this regard, in response to powering the electric motor 344, the electric motor 344 causes the drive shaft 343, and the plurality of rotor blades 345 to rotate. Accordingly, air received at an inlet 341 of the compressor 340 is compressed in response to traversing through the compressor 340 and is output from the outlet 349 of the compressor 340 in a compressed and super-heated state. The super-heated air that is output from the outlet 349 of the compressor 340 is recycled into one or more devices 305 in the production plant 205 as described further herein.

In various embodiments, the system 300 further comprises various fluid lines configured to fluidly couple various components of the system 300. For example, the distillation device 210 is fluidly coupled to the inlet 331 (e.g., an inlet plenum or an inlet header) of the fin-fan heat exchanger 320 by a fluid line 391. Similarly, the outlet 339 of the fin-fan heat exchanger 320 is fluidly coupled to one of the one or more condensers 399 via a fluid line 392. In various embodiments, as described further herein, the fluid line 391 and the fluid line 392 can replace fluid line 201, the fluid line 391 and the fluid line 392 can replace the fluid line 291, the condenser 222, and the fluid line 291, or the fluid line 391 and the fluid line 392 can replace the fluid line 201, the condenser 222, the fluid line 291, and the vent condenser 224 from FIG. 2. Stated another way, the fluid line 392 could extend directly to the reflux tank 230, through the condensers 222, 224, or through one of the condenser 222 or the vent condenser 224 and still be within the scope of this disclosure. In various embodiments, by (1) replacing the fluid line 201 from FIG. 2 with the fluid line 391, the fin-fan heat exchanger 320, and the fluid line 392; and (2) keeping the condenser 222 and the vent condenser 224 from FIG. 2, the fin-fan heat exchanger 320 can be optimized for heating air that is output from outlet 329 of the housing, as opposed to serving a dual purpose of condensing the heated vapor 202 and heating the air, resulting in a more efficient operation.

In various embodiments, the outlet 329 (e.g., the air outlet) of the fin-fan heat exchanger 320 is fluidly coupled to an inlet 341 of the compressor 340 by a fluid line 393. The fluid line 393 can comprise one or more ducts, one or more tube assemblies, or the like. The present disclosure is not limited in this regard. In various embodiments, the outlet 349 of the compressor 340 is fluidly coupled to the one or more devices 305 in the production plant 205 by one or more fluid lines 394.

In various embodiments, each of the fluid lines 391, 392, 393, 394 can be a single tube assembly, multiple tube assemblies coupled together by pipe fittings, couplings, or the like to form a single fluid line, multiple tube assemblies disposed in parallel between an inlet header and an outlet header, or the like. The present disclosure is not limited in this regard.

Figure 3B:
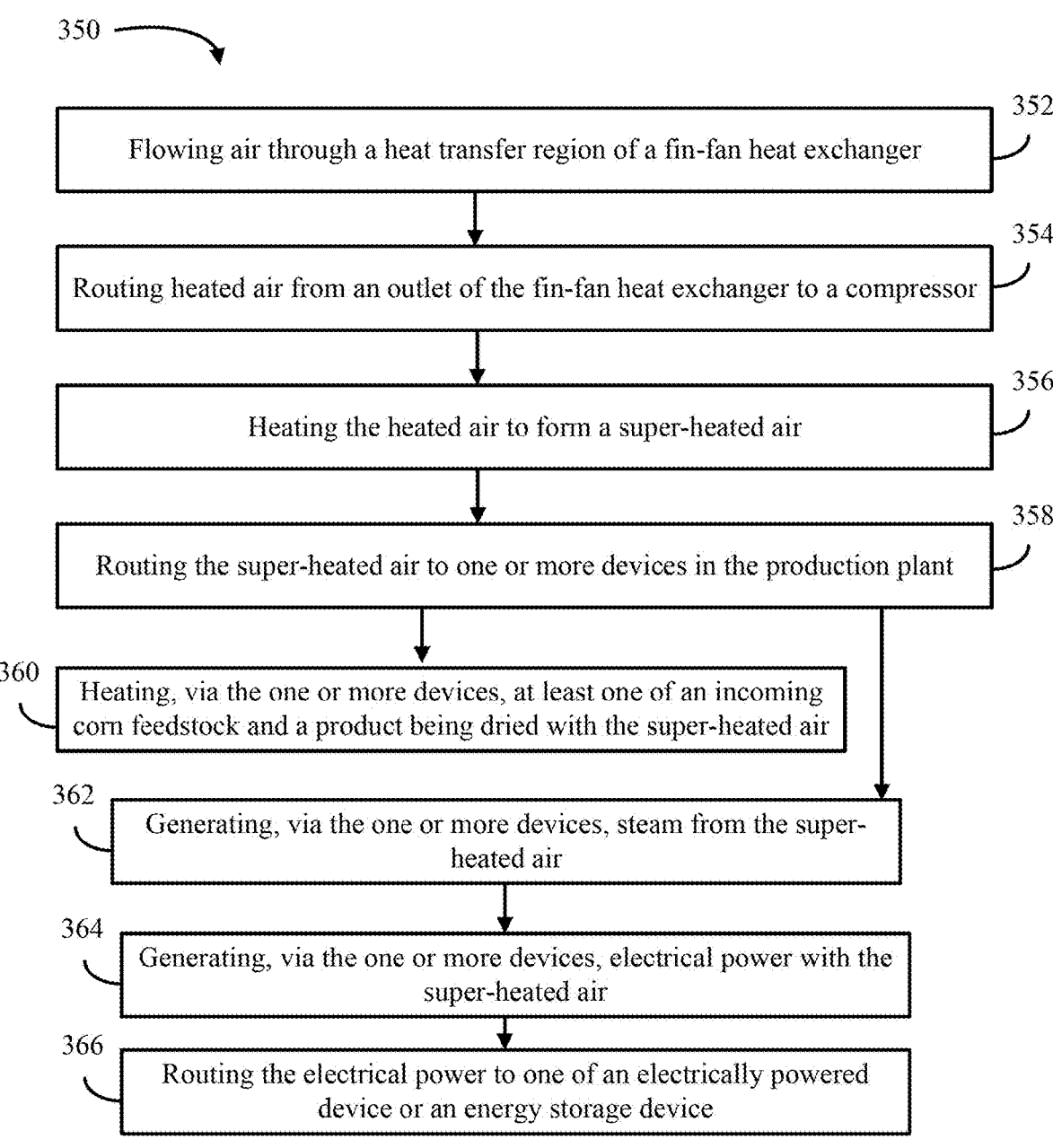
FIG. 3B illustrates a method of operating the system of FIG. 3A, in accordance with various embodiments.

Referring now to FIGS. 3A and 3B, a method 350 for recycling energy that is generated from the distillation device 210 is illustrated, in accordance with various embodiments. The method 350 comprises flowing air (e.g., air input A) through a heat transfer region 325 of the fin-fan heat exchanger 320 simultaneously with flowing a heated vapor 202 received from a distillation device 210 in the production plant 205 through a bundle of finned tubes 326 in the heat transfer region 325 of the fin-fan heat exchanger 320 to form a heated air (e.g., air output B) (step 352). In various embodiments, the air input A can be received from an external environment (e.g., the air input A can comprise ambient air). In this regard, the air input A can be approximately 68° F. (20° C.), in accordance with various embodiments. In response to the air input A absorbing heat from the heated vapor 202, the heated air (e.g., air output B) that is exhausted out the fin-fan heat exchanger 320 can be at a temperature T2 that is between 100° F. (38° C.) and 150° F. (66° C.).

In various embodiments, the method 350 further comprises routing the heated air (e.g., air output B) to a compressor 340 (step 354). The heated air can be routed through a fluid line 393 (e.g., one or more ducts, one or more tube assemblies, or the like). In various embodiments, the system 300 can comprise a plurality of the fin-fan heat exchanger 320. In this regard, an air output B for each of the plurality of the fin-fan heat exchanger 320 can be routed to a respective compressor (i.e., each fin-fan heat exchanger can correspond to a respective downstream compressor), or a set of the plurality of the fin-fan heat exchanger 320, or all of the plurality of the fin-fan heat exchanger 320, can feed a single compressor (e.g., compressor 340). The present disclosure is not limited in this regard.

In various embodiments, the method 350 further comprises heating, in response to flowing the heated fluid through the compressor 340, the heated fluid from the temperature T2 to a temperature T3 to form a super-heated fluid (e.g., super-heated air output C) (step 356). In various embodiments, the temperature T3 output from the compressor 340 can be at least double the temperature T2 that is input into the compressor 340. In various embodiments, the temperature T3 can be between 400° F. (204° C.) and 600° F. (316° C.). In various embodiments, compressor 340 can be sized and configured to produce the super-heated air at a temperature T3 that is usable for one or more devices 305 in the production plant 205.

In various embodiments, the method 350 further comprises heating, via the one or more devices 305, at least one of an incoming corn feedstock (e.g., via the dryer 102 from FIG. 1) and a product being dried (e.g., via the one or more dryers 138 from FIG. 1) with the super-heated air output C (step 360). In this regard, the one or more devices 305 can be a component of the dryer 102 and/or the one or more dryers 138 from FIG. 1. For example, the one or more devices 305 can comprise the dryer 102. The super-heated air output C can then be routed to the dryer 102 and be configured to pre-dry the feedstock 101 in the dryer 102 such that moisture can be removed from the feedstock 101 prior to milling in the mill 103 of process 100. In various embodiments, the super-heated air output can replace a gas-powered source for the dryer 102. In various embodiments, the one or more devices 305 can comprise at least one of the one or more dryers 138 from the process 100 from FIG. 1. In this regard, the super-heated air output C can be configured to remove moisture from the cake stream 122A to form one or more feed products (e.g., Hi-Pro 140, Enrich Yeast Hi-Pro 144, DDG 142, and/or DDGS 146), in accordance with various embodiments. In various embodiments, the super-heated air output C can replace a gas-powered heating unit for the one or more dryers 138.

In various embodiments, the method 350 further comprises generating, via the one or more devices 305, steam from the super-heated air (step 362). In this regard, the one or more devices 305 can be configured as a component of the boiler 111 and/or the one or more evaporators 128. For example, in various embodiments, the one or more devices 305 can comprise the boiler 111. In this regard, the super-heated air output C can be fed to the boiler 111 from FIG. 1 and configured as a heating unit of the boiler 111, in accordance with various embodiments. Accordingly, the super-heated air output C can replace a gas-powered heating unit of the boiler 111 as described further herein, in accordance with various embodiments. In various embodiments, the one or more devices 305 can comprise at least one of the evaporators 128 from the process 100 of FIG. 1. In this regard, the super-heated air output C can evaporate a liquid (e.g., water), and the evaporated liquid (e.g., steam) can drive the one or more evaporators 128, in accordance with various embodiments. Accordingly, the super-heated air-output can replace a gas powered evaporator, in accordance with various embodiments.

In various embodiments, the method 350 further comprises generating, via the one or more devices 305, electrical power with the super-heated air (step 362) and routing the electrical power to one of an electrically powered device or an energy storage device (step 364). In this regard, the one or more devices 305 can comprise the boiler 111 and the turbine 150. The boiler 111 can generate steam in accordance with step 362 and the steam can be routed to the turbine 150 to power the turbine 150 and generate the electrical power in step 364. Accordingly, additional electricity can be provided to the production plant 205, in accordance with various embodiments.

In various embodiments, in step 352 of the method 350, the method 350 can further comprise at least partially condensing, via the fin-fan heat exchanger 320, the heated vapor 202 to form a condensed vapor (or alcohol condensate 203) and exhausting the condensed vapor to one or more condensers 399 (e.g., the condenser 222 followed by the vent condenser 224 or one of the condenser 222 or the vent condenser 224) or a reflux tank 230 directly. In this regard, the fin-fan heat exchanger 320 can reduce an amount of condensation performed by the condensers 222, 224 from FIG. 2, eliminate one of the condensers 222, 224, or eliminate both of the condensers 222, 224 in accordance with various embodiments.

Accordingly, the method 350 for the system 300 utilizes the heat from the heated vapor 202 to heat air pulled from an external environment by the fan 324 of the fin-fan heat exchanger 320, then super-heats the heated air via the compressor 340 and utilizes the super-heated air in one or more devices 305 (e.g., to power a device, to supply heat for the device, or the like) disposed within the production plant 205. In this regard, the method 350 can significantly reduce a carbon footprint of a production plant relative to typical production plants as described previously herein.

In various embodiments, the one or more devices 305 can include any number of the devices described previously herein. In this regard, step 360 and steps 362, 364, 366 of method 350 can be performed in parallel in accordance with various embodiments. In various embodiments only some of the one or more devices 305 described herein may utilize the super-heated air generated in step 358. In various embodiments, only one of the one or more devices 305 described previously herein may utilize the super-heated air generated in step 358. For example, the one or more devices 305 could comprise only the dryer 102, only the one or more dryers 138, only the boiler 111, or the like. The present disclosure is not limited in this regard and any combination of devices in the production plant 205 can be utilized and be within the scope of this disclosure, in accordance with various embodiments.

Referring now to FIGS. 4, 5, 6, and 7, a system 400, 500, 600, 700 for recycling energy in a production plant 205 (e.g., a production plant configured to perform the process 100 from FIG. 1), with like numerals depicting like elements is illustrated in accordance with various embodiments. As described further herein, the system 400, 500, 600, 700 can be retrofitted into the system 200 from FIG. 2 (e.g., via the retrofitting process 1300 from FIG. 13). The system 400, 500, 600, 700 is configured to recycle energy that is output from the distillation device 210 back into the production plant 205. Stated another way, instead of wasting excess heat that is generated from the distillation device 210 into the atmosphere, the system 400 can utilize that heat from the distillation device 210 to heat a refrigerant 499 in a heat pump 405, 505.

With reference now to FIGS. 4 and 5, instead of utilizing heat from the heated vapor 202 in a fin-fan heat exchanger 320 as shown in system 300 from FIG. 3A, the heat from the heated vapor 202 can be utilized as a heat source for an evaporator 402 of a heat pump 405 or an evaporator 402 of a heat pump 505 from FIG. 5. In this regard, the evaporator 402 of the heat pump 405, 505 can be configured to at least partially condense the heated vapor 202 into an alcohol condensate (e.g., alcohol condensate 203 from FIG. 2) in a similar manner to the system 200 from FIG. 2 and the system 300 from FIG. 3A.

In various embodiments, the heated vapor 202 (or partially condensed alcohol condensate) that is output from the evaporator 402 can be further condensed via the one or more condensers 399 (e.g., via heat exchange facilitated from the evaporative cooling tower 240 as shown and discussed in FIG. 2 previously herein), the condensers 222, 224 from FIG. 2 can both be scrapped from the production plant 205, or one of the condensers 222, 224 can be scrapped from the production plant 205 and the other kept as the one or more condensers 399 in a similar manner to the system 300 from FIG. 3A. The present disclosure is not limited in this regard. In contrast to the fin-fan heat exchanger 320 from FIG. 3A, a heat exchanger 410 can be configured as an evaporator 402 of the heat pump 405, 505. In this regard, the heat exchanger 410 can be configured to transfer heat from the heated vapor 202 to the refrigerant 499 traveling therethrough. In response to the heat being transferred to the refrigerant 499, the refrigerant 499 evaporates and forms a hot gas that is fed to a compressor 406 of the heat pump 405. In various embodiments, the refrigerant 499 can be in a solid phase at an inlet of the evaporator 402 (e.g., inlet port 421 of the heat exchanger 410 as described further herein) or in a gas phase at the inlet (e.g., inlet port 421 of the heat exchanger 410 as described further herein) of the evaporator 402. The present disclosure is not limited in this regard.

Referring now to FIG. 4, the heat pump 405 comprises a refrigerant loop 401. The refrigerant loop 401 comprises an evaporator 402, a condenser 404, a compressor 406, and an expansion valve 408. The refrigerant loop 401 further comprises fluid lines 491, 492, 493, 494 (e.g., fluid conduits). The fluid lines 491, 492, 493, 494 are configured to route the refrigerant 499 of the heat pump 405 through the refrigerant loop 401. In this regard, the fluid line 491 extends from an outlet of the expansion valve 408 to an inlet of the evaporator 402 (e.g., inlet port 421 of the heat exchanger 410). The fluid line 492 extends from an outlet of the evaporator 402 (e.g., the outlet port 422 of the heat exchanger 410) to a compressor 406. The fluid line 493 extends from an outlet of the condenser 404 to an inlet 437 of the expansion valve 408. The fluid line 494 extends from an outlet 438 of the heat exchanger 430 to an inlet of the expansion valve 408. In various embodiments, each of the fluid lines 491, 492, 493, 494 can be a single tube assembly or multiple tube assemblies coupled together by pipe fittings, couplings, or the like. The present disclosure is not limited in this regard.

In various embodiments, the compressor 406 can comprise a scroll compressor, a rotary compressor, or the like. Any compressor capable of compressing a refrigerant 499 in a refrigerant loop 401 of a heat pump 405 is within the scope of this disclosure.

In various embodiments, the expansion valve 408 can be any expansion valve known in the art of heat pumps. For example, the expansion valve 408 can comprise an internally equalized or externally equalized expansion valve. The present disclosure is not limited in this regard.

In various embodiments, the heat exchanger 410 is configured as an evaporator 402 of the refrigerant loop 401. Stated another way, the refrigerant 499 can be configured to change phases from a solid at an inlet of the heat exchanger 410 (e.g., proximate the inlet port 421 of the heat exchanger 410) to a gas at the outlet of the heat exchanger 410 (e.g., proximate the outlet port 422 of the heat exchanger 410) in response to absorbing heat from the heated vapor 202, in accordance with various embodiments. In various embodiments, the refrigerant 499 can comprise carbon dioxide. However, the present disclosure is not limited in this regard. For example, the refrigerant 499 could comprise a hydrocarbon-based refrigerant (e.g., R-12A, R-502A, R1270, R170, R290, R600A, R601a, etc.), ammonia (e.g., R717), carbon dioxide (e.g., R-744), hydrofluoroolefin (HFO) refrigerants (e.g., R1234ZEE, R1234YF, etc.), or any other low environmental impact refrigerant known in the art and would still be within the scope of this disclosure.

The heat exchanger 410 can comprise a tube and shell heat exchanger 411. In various embodiments, the heat exchanger 410 comprises a shell 412, a bundle of tubes 413, one or more baffles 423, an inlet plenum 415, an outlet plenum 416, an inlet port 421, an outlet port 422, and one or more baffles 423. In various embodiments, each of the bundle of tubes 413 extends from a first side of the shell 412 to a second side of the shell 412. Although illustrated as being straight tubes, the present disclosure is not limited in this regard. For example, the bundle of tubes 413 could include bent tubes and would still be within the scope of this disclosure. In various embodiments, straight tubes can facilitate an ease of manufacture and an ease of assembly for the heat exchanger 410.

Figure 11:
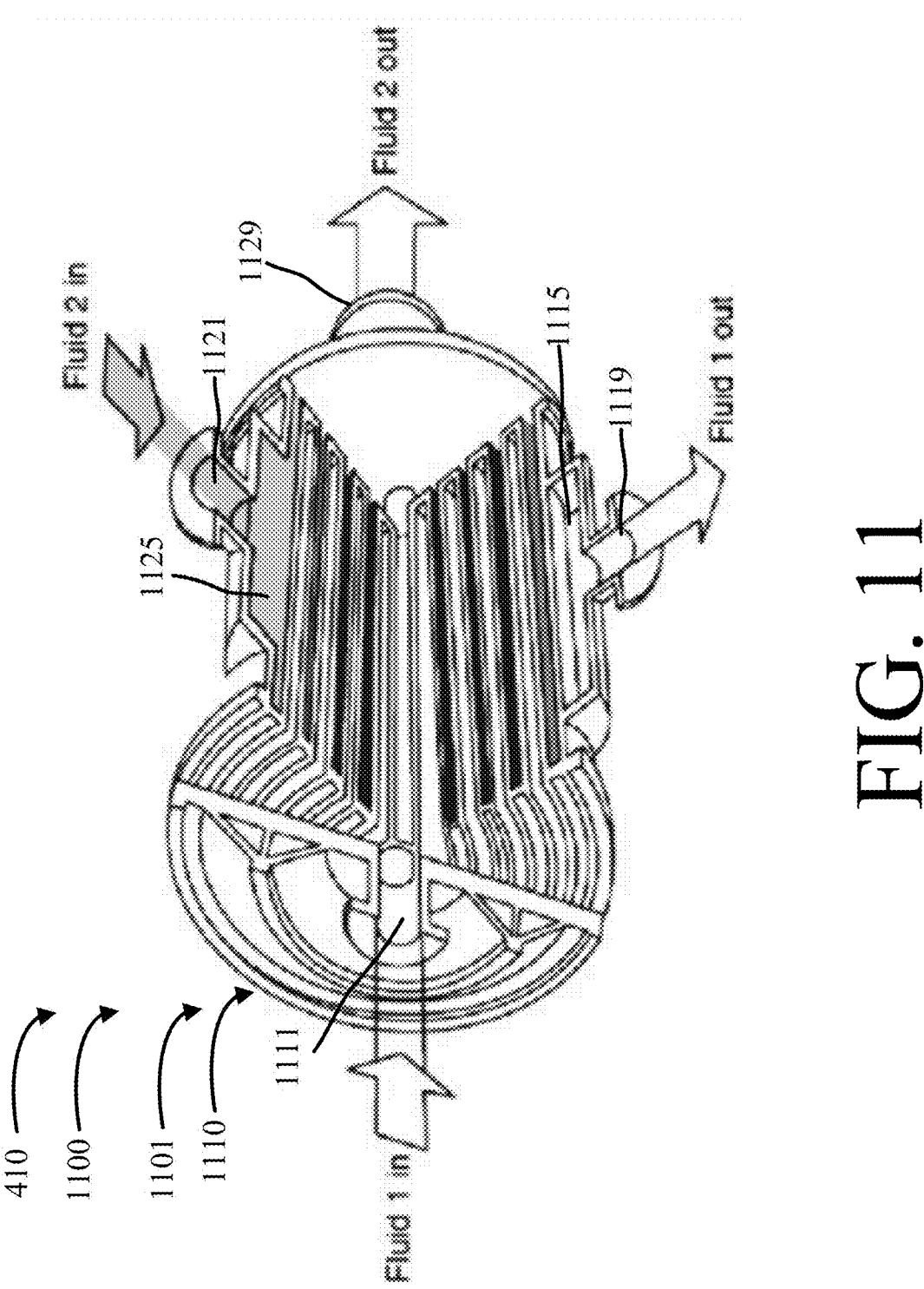
FIG. 11 illustrates a heat exchanger for use in the system of FIGS. 5, 7, and/or 8, in accordance with various embodiments.

Although the tube and shell heat exchanger 411 is illustrated as a two-pass tube and shell heat exchanger, the present disclosure is not limited in this regard. For example, the heat exchanger 410 could comprise a single pass heat exchanger, a four-pass heat exchanger, or the like and still be within the scope of this disclosure. Similarly, although illustrated as comprising a tube and shell heat exchanger 411 in FIGS. 4 and 5, the present disclosure is not limited in this regard. For example, with brief reference to FIG. 11, the heat exchanger 410 could comprise a spiral heat exchanger 1100 and still be within the scope of this disclosure. The spiral heat exchanger 1100 could comprise a counter-flow arrangement 1101 as illustrated in FIG. 11. For example, a first fluid inlet 1111 could be disposed at a radially inner end of a housing 1110 and spiral radially outward along a first fluid path 1115 to a first fluid outlet 1119. In contrast, a second fluid inlet 1121 could be disposed at a radially outer end of the housing 1110 and spiral radially inward along a second fluid path 1125 to a second fluid outlet 1129. In this regard, the heated vapor 202 could travel along the first fluid path 1115 and the refrigerant 499 could travel along the second fluid path 1125 (or vice versa) and facilitate at least partial condensing of the heated vapor 202 and heating of the refrigerant 499, in accordance with various embodiments.

In various embodiments, the heat exchanger 410 includes a first flow path for the heated vapor 202 and a second flow path for the refrigerant 499. In this regard, the inlet plenum 415, the bundle of tubes 413, and the outlet plenum 416 can at least partially define a flow path for the heated vapor 202. Similarly, the inlet port 421, the one or more baffles 423, and the outlet port 422 can at least partially define a flow path for the refrigerant. In this regard, the heat exchanger 410 defines a heat transfer region 425 within the shell 412 where the refrigerant 499 is configured to absorb heat from the heated vapor 202, causing the heated vapor 202 to transition into one of an alcohol condensate (e.g., alcohol condensate 203 from FIG. 2) or a partially cooled heated vapor, and cause the refrigerant 499 to transition from a solid to a gas, or a cooled gas to a heated gas, in accordance with various embodiments. In this regard, the heated vapor 202 from the distillation device 210 can act as a heat source for the evaporator 402 of a heat pump 405.

In various embodiments, the heat exchanger 430 is configured as the condenser 404 of the heat pump 405. In various embodiments, the heat exchanger 430 can comprise any heat exchanger configured to condense the refrigerant 499 traveling therethrough and heat air that is flowed therethrough. In various embodiments, the heat exchanger 430 can comprise a plate and frame heat exchanger, a tube and shell heat exchanger, a spiral wound heat exchanger, a coil wound heat exchanger, a falling film heat exchanger, a fin-fan heat exchanger, or the like. The present disclosure is not limited in this regard. In various embodiments, the heat exchanger 430 comprises a housing 432, a condenser coil 433 disposed through the housing 432, and a fan 434 coupled to the housing 432 and disposed proximate an inlet 431 of the housing 432 (or an outlet 439 of the housing 432). The heat exchanger 430 further comprises a heat transfer region 435 disposed within the housing 432.

The fluid line 493 extends from an outlet of the compressor 406 to an inlet of the condenser coil 433. Similarly, the fluid line 494 extends from an outlet 438 of the condenser coil 433 to an inlet of the expansion valve 408. In various embodiments, the refrigerant 499 is in a heated gaseous state as the refrigerant 499 is output from the compressor 406, the air that is flowed through the housing 432 of the heat exchanger 430 then absorbs heat from the refrigerant 499 in the heat transfer region 435 of the heat exchanger and is output from the outlet 439 of the housing in a super-heated state similar to the air output C from FIG. 3A. In this regard, the heat exchanger 430 can be configured to supply an air output D to the one or more devices 305 in a similar manner to that described in FIGS. 3A and 3B previously herein. For example, one or more fluid lines 495 can extend from an outlet 439 of the heat exchanger 430 to the one or more devices 305. In various embodiments, each of the one or more fluid lines 495 can correspond to a respective device in the one or more devices 305. In this regard, when the air output D is utilized in multiple devices, multiple fluid lines can be coupled to the outlet 439, which can act as a header, or a plenum, for the one or more fluid lines 495, in accordance with various embodiments.

In various embodiments, the system 400 further comprises fluid line 481 and fluid line 482. In this regard, the fluid line 481, the heat exchanger 410, and the fluid line 482 can replace the fluid line 201 from FIG. 2. For example, the distillation device 210 can be fluidly coupled to the inlet plenum 415 of the heat exchanger 410 by the fluid line 481. In this regard, the fluid line 481 extends from an outlet of the distillation device 210 to the inlet plenum 415 of the heat exchanger. The fluid line 482 can extend from an outlet plenum 416 of the heat exchanger 410 to one or more condensers 399. In various embodiments, the one or more condensers 399 can comprise the condenser 222 and the vent condenser 224 from FIG. 2. In various embodiments, the one or more condensers 399 can comprise one of the condenser 222 or the vent condenser 224. In various embodiments, the fluid line 482 can be routed directly to the reflux tank. The present disclosure is not limited in this regard. In various embodiments, by (1) replacing the fluid line 201 from FIG. 2 with the fluid line 481, the heat exchanger 410, and the fluid line 482; and (2) keeping the condenser 222 and the vent condenser 224 from FIG. 2, the heat exchanger 410 can be optimized for functioning as the evaporator 402 of the heat pump 405, as opposed to serving a dual purpose of condensing the heated vapor 202 and the evaporator 402 of the heat pump 405, resulting in a more efficient operation.

Although the heat exchanger 430 is illustrated in FIG. 4 as heating air from an external environment, the present disclosure is not limited in this regard. More specifically, the heat exchanger 430 could be replaced with a heat exchanger configured to generate steam as opposed to a super-heated air.

For example, with reference now to FIG. 5, with like numerals depicting like elements, a heat pump 505 could include a heat exchanger 530 instead of the heat exchanger 430 from FIG. 4. The heat exchanger 530 could be fluidly coupled to a fluid supply 510 (e.g., a water supply) and a pump 520. In this regard, the fluid supply 510 can be fluidly coupled to an inlet 531 of a housing 532 of the heat exchanger 530. The pump 520 could be configured to pump water from the fluid supply 510 through the inlet 531 of housing 532 of the heat exchanger 530. In response to the water traversing through the heat transfer region 535 of the heat exchanger, the water could be converted to steam. In this regard, the heat exchanger 530 could be configured to generate steam and provide a steam output E that is generated at an outlet 539 of the housing 532 of the heat exchanger 530 to the one or more devices 305 as described further herein. The system 500 can further comprise one or more fluid lines 595 configured to route the steam to the one or more devices 305. The one or more fluid lines can be routed in a similar manner to the one or more fluid lines 495 described previously herein, in accordance with various embodiments.

Although heat exchanger 430 from FIG. 4 and heat exchanger 530 from FIG. 5 are illustrated as replacements for one another, the present disclosure is not limited in this regard. For example, the heat exchanger 430 from FIG. 4 and the heat exchanger 530 from FIG. 5 can be disposed in series between the compressor 406 and the expansion valve 408 and still be within the scope of this disclosure. In this regard, a temperature of the refrigerant 499 can be cycled down as the refrigerant 499 travels from the compressor 406 to the expansion valve 408, in accordance with various embodiments.

Although illustrated as utilizing the heated vapor 202 as a heat transfer fluid in the evaporator 402 of the heat pump 405 in FIG. 4, the present disclosure is not limited in this regard. More specifically, water from the fluid circuit 244 of the evaporative cooling tower 240 from FIG. 4 can be utilized as a heat transfer fluid in the evaporator 402 of the heat pump 405 and still be within the scope of this disclosure.

For example, with reference now to FIG. 6, with like numerals depicting like elements, in the system 600, the heat pump 405 can be configured to receive heated water that is output from the condenser 222 in the fluid circuit 244. In this regard, the fluid line 262 from FIG. 2 can be replaced with fluid line 601, the heat exchanger 410, and the fluid line 602 as described further herein. Accordingly, the system 600 can include an output line 603 of the fluid circuit 244 that replaces the fluid line 262 from FIG. 2. The output line 603 includes a fluid path defined by the fluid line 601 that extends from an outlet of the condenser 222 to the inlet plenum 415 of the heat exchanger 410, through the bundle of tubes 413, out the outlet plenum 416, and through the fluid line 602 that extends from the outlet plenum 416 of the heat exchanger 410 to the common return header 261, and back to the evaporative cooling tower 240.

Accordingly, the system 600 from FIG. 6 can recycle heated water that is output from the condenser 222 through the heat exchanger 410 of the heat pump 405 to act as the evaporator 402 of the heat pump 405 by heating the refrigerant 499 between the expansion valve 408 and the compressor 406 prior to returning the heated water to the evaporative cooling tower 240 through the fluid line 602 and the common return header 261. Accordingly, the heated water that is output from the condenser 222 in the production plant 205 can be re-used to heat the refrigerant 499 of the heat pump 405 in the system 600, in accordance with various embodiments.

Although illustrated in FIG. 6 as utilizing heated water that is output from the condenser 222, the present disclosure is not limited in this regard. For example, the evaporator 402 could utilize heated water from the vent condenser 224 and still be within the scope of this disclosure. However, utilizing heated water from the vent condenser 224 would be less efficient relative to utilizing heated water from the condenser 222 as water that would be output from the vent condenser 224 because the heated water from the condenser 222 would be hotter relative to the heated water from the vent condenser 224.

Although illustrated as utilizing the heated vapor 202 as the heat transfer fluid of the evaporator 402 of the heat pump 505 in FIG. 5, the present disclosure is not limited in this regard. More specifically, similar to the system 600 from FIG. 6 utilizing the heated water from the condenser 222 in the heat pump 405, water from the fluid circuit 244 of the evaporative cooling tower 240 from FIG. 5 can be utilized as a heat transfer fluid in the evaporator 402 of the heat pump 505 and still be within the scope of this disclosure.

For example, with reference now to FIG. 7, with like numerals depicting like elements, in the system 700, the heat pump 405 can be configured to receive heated water that is output from the condenser 222 in the fluid circuit 244. In this regard, the fluid line 262 from FIG. 2 can be replaced with fluid line 601, the heat exchanger 410 of the heat pump 505, and the fluid line 602 as described above with respect to the heat pump 405 of system 600 from FIG. 6. Accordingly, the system 700 can include the output line 603 of the fluid circuit 244 that replaces the fluid line 262 from FIG. 2. The output line 603 includes a fluid path defined by the fluid line 601 that extends from an outlet of the condenser 222 to the inlet plenum 415 of the heat exchanger 410, through the bundle of tubes 413, out the outlet plenum 416, and through the fluid line 602 that extends from the outlet plenum 416 of the heat exchanger 410 to the common return header 261, and into the common return header 261 as outlined above. Accordingly, the fluid circuit 244 of system 600 from FIG. 6 and system 700 from FIG. 7 can be the same.

Although described herein as utilizing the fluid circuit 244 of the evaporative cooling tower 240 to facilitate exchanging heat between a process stream that is output from the distillation device 210 through the condensers 222, 224, the present disclosure is not limited in this regard. For example, water that is flowed through the fluid circuit 244 can be utilized in other areas of the production plant 205 and still be within the scope of this disclosure.

Figure 8:
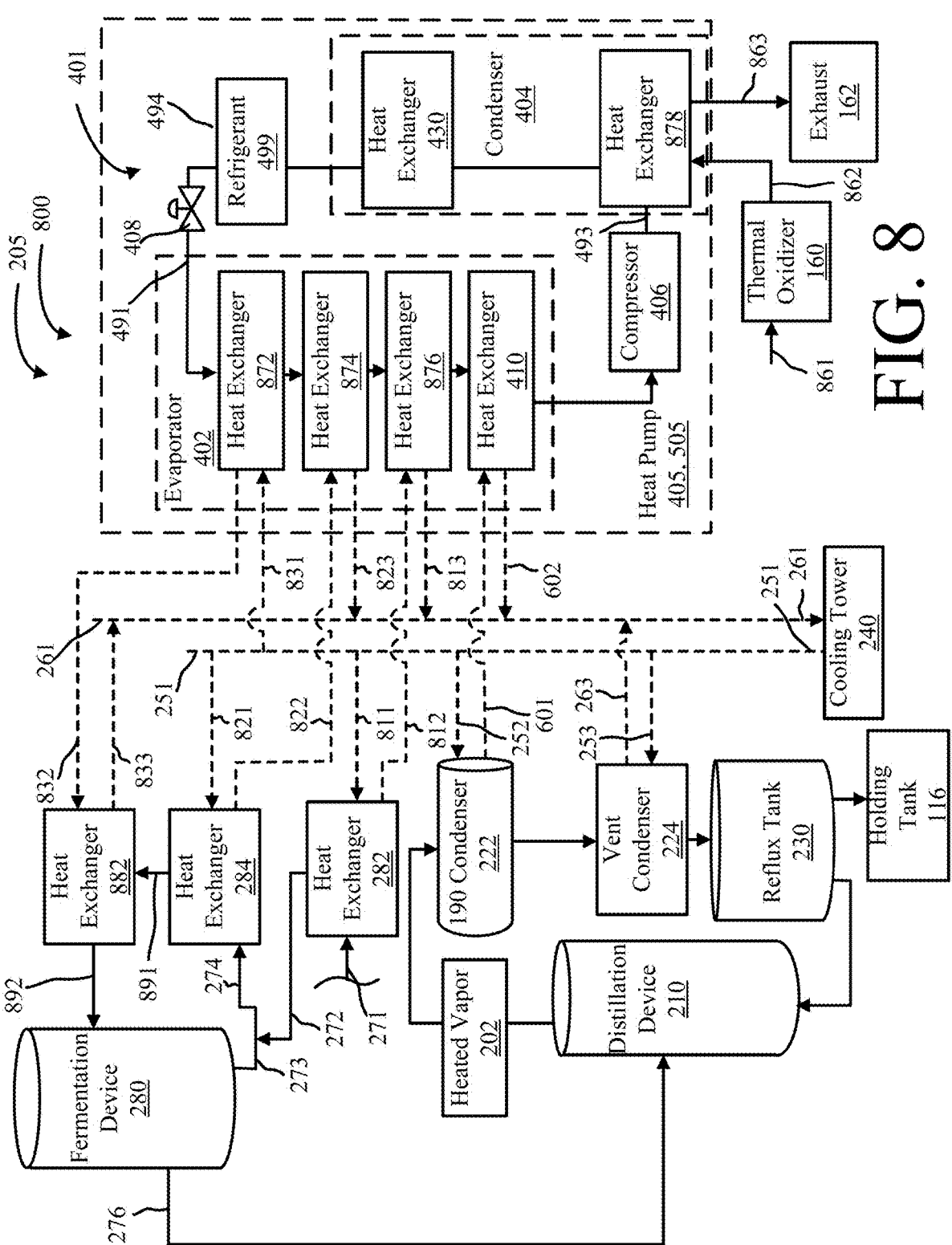
FIG. 8 illustrates a system for recycling energy in a production plant, in accordance with various embodiments.

For example, with reference now to FIG. 8, the production plant 205 with a system 800 configured to recycle energy from other areas of the production plant 205 is illustrated, in accordance with various embodiments. In various embodiments, the system 800 can be utilized in the production plant 205 in combination with any of the systems 300, 400, 500, 600, 700 from FIGS. 3A, 4, 5, 6, 7, or without any of the systems 300, 400, 500, 600, 700. The present disclosure is not limited in this regard. In various embodiments, if the production plant 205 with the system 200 from FIG. 2 is being retrofitted with the system 600 from FIG. 6 or the system 700 from FIG. 7, the system 800 can also be easily retrofitted therein because the fluid circuit 244 will have to be modified anyway to retrofit the system 200 with system 600 or system 700. However, the system 800 is in no way limited to being utilized in combination with system 600 or system 700. For example, the system 800 could be used in combination with system 300 from FIG. 3A, system 400 from FIG. 4, or system 500 from FIG. 5. Similarly, in various embodiments, for large production plants, two or more of the systems 300, 400, 500, 600, 700, 800 described herein could be used in combination, or three or more of the systems 300, 400, 500, 600, 700, 800 could be used in combination, or the like. The present disclosure is not limited in this regard.

In various embodiments, although the heat pump 405 illustrated in FIGS. 4 and 6 and the heat pump 505 illustrated in FIGS. 5 and 7 are shown with only one heat exchanger (e.g., heat exchanger 410) configured as an evaporator 402 of the respective heat pump 405, 505, the present disclosure is not limited in this regard. For example, with continued reference to FIG. 8, the evaporator 402 of the heat pump 405, 505 can further comprise two or more heat exchangers (e.g., heat exchanger 872, heat exchanger 874, heat exchanger 876, and/or heat exchanger 410). In this regard, the evaporator 402 can comprise an array of heat exchangers that cycle up a temperature of the refrigerant 499 as the refrigerant 499 travels between the expansion valve 408 and the compressor 406. For example, heat exchanger 874 can be configured to receive water from fluid line 822 that is warmer than the water that heat exchanger 872 receives from fluid line 831, heat exchanger 876 can be configured to receive water from fluid line 812 that is warmer than the water that heat exchanger 874 receives from fluid line 822, and the heat exchanger 410 is configured to receive water from fluid line 602 that is warmer than the water that heat exchanger 876 receives from fluid line 812.

In various embodiments, each heat exchanger in the array of heat exchangers that forms the evaporator 402 can be configured to receive water from the evaporative cooling tower 240 that has been cycled through another heat exchanger (e.g., condenser 222, heat exchanger 282, heat exchanger 284, and/or heat exchanger 882) to facilitate this cycled up heating effect on the refrigerant 499 that traverses through the refrigerant loop 401.

Although illustrated as including four heat exchangers in the array of heat exchangers of FIG. 8, the present disclosure is not limited in this regard. For example, any combination of the array of heat exchangers is within the scope of this disclosure. Additionally, one skilled in the art may recognize various additional heat exchangers that can be used in the evaporator of a heat pump 405, 505 as described herein and would still be within the scope of this disclosure.

In various embodiments, the heat exchanger 872 can be configured as a pre-cooling loop to cool water supplied from the evaporative cooling tower 240 (e.g., via common supply header 251) and supply the cooled water to a heat exchanger 882 configured to cool a beer mash prior to supplying the beer mash to the fermentation device 280 or to cool a mash being fermented in the fermentation device 280. The present disclosure is not limited in this regard. For example, in accordance with various embodiments, a water can be supplied from the evaporative cooling tower 240, through the common supply header 251, and through the fluid line 831 to the heat exchanger 872. The heat exchanger 872 can then pre-cool the water received and output the pre-cooled water to a heat exchanger 882 via fluid line 832. The pre-cooled water supplied to the heat exchanger 882 can be heated up by the heat exchanger 882 and supplied back to the common return header 261 via the fluid line 833. Accordingly, the heat exchanger 882 can be disposed fluidly between the heat exchanger 284 and the fermentation device 280 to further cool the beer mash received from the heat exchanger 284 via fluid line 891 prior to conveying the beer mash to the fermentation device 280 via fluid line 892. Although heat exchanger 882 is illustrated as being separate from the fermentation device 280 and configured to provide a beer mash stream to the fermentation device 280, the present disclosure is not limited in this regard. For example, the heat exchanger 882 can be a component of the fermentation device 280 and configured to cool the beer mash received from the heat exchanger 284 during fermentation 110 of process 100 from FIG. 1.

In various embodiments, the heat exchanger 872 can be configured to perform an initial heating step of the refrigerant 499 after the refrigerant is output from the expansion valve. For example, the refrigerant 499 can be output from the expansion valve in a cold, solid state. Accordingly, the heat exchanger 872 can heat the refrigerant 499 while cooling the water received from the evaporative cooling tower 240.

In various embodiments, the heat exchanger 874 can be configured to receive water that was previously heated by another heat exchanger (e.g., heat exchanger 284 as described previously herein), and the heat exchanger 876 can be configured to receive water that was previously heated by another heat exchanger (e.g., heat exchanger 282). In this regard, the water received from the heat exchanger 284 (e.g., via fluid line 822) is warmer than the water supplied to the heat exchanger 872 but colder than the water supplied to the heat exchanger 876, further facilitating the cycle up in temperature of the refrigerant 499 through the array of heat exchangers.

In various embodiments, the condenser 404 of the heat pump 405, 505 can also include an array of heat exchangers. For example, the condenser 404 can further comprise a heat exchanger 878 configured to cycle up a temperature of the refrigerant between the heat exchanger 430 and the compressor 406. Although illustrated as being upstream of the heat exchanger 430, the present disclosure is not limited in this regard. For example, the heat exchanger 878 could be downstream of the heat exchanger 430 depending a respective operational temperature of a fluid for each of the heat exchanger 430 and the heat exchanger 878, in accordance with various embodiments. The heat exchanger 878 can be configured to exchanger heat between the refrigerant 499 flowing through the refrigerant loop 401 of the heat pump 405, 505, and an exhaust fluid output from the thermal oxidizer 160, which receives an exhaust fluid (e.g., via fluid line 861) from each of the one or more dryers 138 from FIG. 1. In this regard, the exhaust fluid generated from the thermal oxidizer 160 can be routed through the heat exchanger 478 prior to being exhausted out the exhaust 162, and excess heat from the exhaust fluid can be utilized to cycle up a temperature of the refrigerant 499, in accordance with various embodiments. Although illustrated as utilizing the exhaust fluid of the thermal oxidizer 160 directly to exchange heat with the refrigerant 499, the present disclosure is not limited in this regard. For example, an output from the thermal oxidizer 160 could be routed to a first heat exchanger that is configured to exchange heat between the fluid exhaust from the thermal oxidizer 160 and water from the evaporative cooling tower 240 (e.g., from the common supply header 251 or from the common return header 261). In this regard, the heated cooling tower water can then be routed through a second heat exchanger (e.g., in the evaporator 402 or the condenser 404) to heat the refrigerant 499 in a similar manner to any of the heat exchanger 872, 874, 876, 410 as described previously herein.

In various embodiments, the system 800 comprises various fluid lines configured to fluidly couple various components of the system 800. In various embodiments, a set of the various fluid lines in the system 800 can replace various fluid lines from the system 200 in the production plant 205 from FIG. 2. For example, with combined reference to FIGS. 2 and 8, the fluid lines 601, 602, 603 can replace fluid lines 252, 262 of system 200, the fluid lines 811, 812, 813 can replace the fluid lines 254, 264 of system 200, and the fluid lines 821, 822, 823 can replace the fluid lines 255, 265, in accordance with various embodiments. In various embodiments, the fluid lines 831, 832, 833 can be added. In various embodiments, as described previously herein, any combination of fluid lines can be replaced and still be within the scope of this disclosure. Similarly, in various embodiments, the fluid lines 862, 863 can replace a fluid line that directly couples the thermal oxidizer 160 to the exhaust 162 in a respective production plant.

Referring now to FIGS. 4, 6, 8, and 9, a method 450 (FIG. 9) for recycling energy in a production plant 205 that is retrofitted with the heat pump 405 from FIG. 4, 6, or 8 is illustrated in accordance with various embodiments. The method 450 comprises cycling a refrigerant 499 through a refrigerant loop 401 of a heat pump (step 452). The refrigerant loop 401 comprising a heat exchanger 410 disposed fluidly between an expansion valve 408 and a compressor 406 and a heat exchanger 430 disposed fluidly between compressor 406 and the expansion valve 408. As described previously herein, the heat exchanger 410 is configured as an evaporator 402 in the refrigerant loop 401 and the heat exchanger 430 is configured as a condenser 404 in the refrigerant loop 401. In various embodiments, the evaporator 402 comprises one or more heat exchangers (e.g., heat exchanger 872, heat exchanger 874, heat exchanger 876, and/or heat exchanger 410).

In various embodiments, the cycling includes flowing the refrigerant 499 in a gaseous phase into the compressor 406. In response to traversing through the compressor 406, the refrigerant 499 is compressed and pressurized. Accordingly, in response to the compression and pressurization, the refrigerant 499 is heated and forms a hotter gas at an outlet of the compressor 406 relative to an inlet of the compressor 406. The hot gas then traverses through the condenser 404 (i.e., the heat exchanger 430). The condenser 404 cools the hot gas to a cooler gas relative to the hot gas. In various embodiments, the hot gas is then flowed into the expansion valve 408, which cools the cooler gas due to a decrease in pressure and supplies the cold gas to the evaporator 402. In various embodiments, responsive to flowing through the expansion valve 408, the cold gas can transition to a solid phase. However, the present disclosure is not limited in this regard. The refrigerant 499 then enters the evaporator 402 in one of a solid phase or a gaseous phase and absorbs heat (e.g., from the heated vapor 202 for system 400 from FIG. 4, from warmed water output from the condenser 222 for system 600 from FIG. 6, from a water supplied by the evaporative cooling tower 240 for system 800, or the like). Responsive to traversing through the evaporator 402 in the solid phase, the refrigerant 499 returns to a gaseous phase. The refrigerant 499 then traverses through the compressor 406 and the cycle is repeated. In various embodiments, the refrigerant 499 is cycled up in temperature by traveling through an array of heat exchangers as shown in the system 800 from FIG. 8.

The method 450 further comprises flowing a re-routed fluid (e.g., a heated vapor 202 from a distillation device 210 of system 400, a water supplied from the evaporative cooling tower 240 of system 600 or system 800) through one or more heat exchangers (e.g., heat exchanger 872, heat exchanger 874, heat exchanger 876, and/or heat exchanger 410) of an evaporator 402 of the heat pump 405 (step 454). In this regard, in various embodiments, the heated vapor 202 is condensed and forms a vent condensate in response to being flowed through the heat exchanger 410 of system 400. Similar to the method 350, the vent condensate can be further condensed via the one or more condensers 399 or be directly flowed into the reflux tank 230. The present disclosure is not limited in this regard.

In various embodiments, for system 600 from FIG. 6, the heat exchanger 410 can be configured to receive a water that is output from the condenser 222 via fluid line 601 that is warmer than a water that was input into the condenser 222 via fluid line 252. In this regard, the refrigerant 499 traveling through the heat exchanger 410 can absorb the heat from the water supplied via fluid line 601 as the water travels through the heat exchanger 410.

In various embodiments, for system 800 from FIG. 8, the array of heat exchangers (e.g., heat exchanger 872, heat exchanger 874, heat exchanger 876, and/or heat exchanger 410) can each be configured to receive a water from the evaporative cooling tower 240. In various embodiments, each of the array of heat exchangers of system 800 can receive water that is routed from one of a separate heat exchanger (e.g., condenser 222, heat exchanger 282, heat exchanger 284, or the like) or directly from the evaporative cooling tower 240 (e.g., via fluid line 831). In this regard, each of the array of heat exchangers of system 800 can be arranged to provide a first fluid to a first heat exchanger that has a lower input temperature relative to a second fluid provided to a second heat exchanger, and so on.

The method 450 further comprises flowing air through the heat exchanger 430 to form a super-heated air (e.g., air output D) (step 456). In various embodiments, the heat exchanger 430 can be configured to heat the air to the temperature T3 described in system 300 from FIG. 3A. In this regard, a remainder of method 450 can be in accordance with steps 358, 360, 362, 364, 366 described previously herein. Stated another way, the air output D produced from the heat pump 405 of system 400 can be a similar temperature to the air output C produced from the system 300 from FIG. 3A, in accordance with various embodiments.

Referring now to FIGS. 5, 7, 8, and 10, a method 550 for recycling energy in a production plant 205 that is retrofitted with the heat pump 505 from FIG. 5, 7, or 8 is illustrated in accordance with various embodiments. The method 550 comprises cycling a refrigerant 499 through a refrigerant loop 401 of a heat pump 505 (step 552). The cycling step 552 is the same as the cycling step 452 with the exception that the heat pump is heat pump 505 from FIGS. 5, 7, and 8 instead of the heat pump 405 from FIGS. 4, 6, and 8. In this regard, the heat exchanger 530 that is configured as the condenser 404 of heat pump 505 is configured to receive a fluid (e.g., water) from a fluid supply 510 to form steam as described further herein.

The method 550 further comprises step 454 from method 450. In this regard, the method 550 comprises flowing a re-routed fluid (e.g., a heated vapor 202 from a distillation device 210 of system 500, a water supplied from the evaporative cooling tower 240 of system 700 or system 800) through one or more heat exchangers (e.g., heat exchanger 872, heat exchanger 874, heat exchanger 876, and/or heat exchanger 410) of an evaporator 402 of the heat pump 505 (step 454) as described previously herein.

The method 550 further comprises flowing a fluid (e.g., water) through the heat exchanger 530 to form steam (step 556). In this regard, the pump 520 can pump water from the fluid supply 510 through a heat transfer region 535 of the heat exchanger 530. The water can be configured to condense the refrigerant 499 as the refrigerant traverses through the heat exchanger 530 in a similar manner to the air traveling through the heat exchanger 430 of the system 400 from FIG. 4. Accordingly, the water can absorb heat from the refrigerant and form steam at an outlet 539 of the heat exchanger 530. In this regard, the heat exchanger 530 is configured to generate steam in response to flowing the water from the fluid supply 510 therethrough. Although the fluid supply 510 is illustrated as being a separate and distinct water supply relative to the water supply 249 of the system 200 from FIG. 2, the present disclosure is not limited in this regard. For example, the fluid supply 510 can be supplied from the evaporative cooling tower 240 (e.g., after being routed from another heat exchanger in system 800, such as heat exchanger 410), in accordance with various embodiments.

In various embodiments, the method 550 further comprises routing the steam to one or more devices 305 (step 558). In this regard, the steam generated from the method 550 can replace, or supplement, a gas-powered boiler, in accordance with various embodiments. For example, the one or more devices 305 configured to receive steam generated in accordance with step 556 of method 550 can include a fermentation device 280 (e.g., configured to perform fermentation 110 from process 100 of FIG. 1), the distillation device 210, or the like.

In various embodiments, the steam generated in step 556 of method 550 can be utilized to power a steam powered turbine (e.g., turbine 150 from FIG. 1) to generate electrical power. In this regard, the method 550 can further comprise steps 364, 366 of method 350 described previously herein. Stated another way, the method 550 can further comprise generating electricity by the steam-powered turbine (e.g., turbine 150 from FIG. 1) in response to flowing the steam to the steam-powered turbine.

Referring now to FIGS. 2, 3A, and 12, a retrofitting process 1200 (FIG. 12) for retrofitting a system 300 (FIG. 3A) for recycling energy into a system 200 of a production plant 205 (FIG. 2) is illustrated, in accordance with various embodiments. The retrofitting process 1200 comprises decoupling a fluid line (e.g., fluid line 201) from a distillation device 210 and a condenser 222 (step 1202). The fluid line 201 can be configured to fluidly couple the distillation device 210 to the condenser 222 in a production plant 205 (e.g., an alkane solvent production plant, such as an ethanol production plant).

The retrofitting process 1200 further comprises installing a fin-fan heat exchanger 320 fluidly downstream from the distillation device 210 (step 1204). As described previously herein the fin-fan heat exchanger 320 is configured to transfer heat from a heated vapor 202 received from the distillation device 210 to air that is flowed through the fin-fan heat exchanger 320 to form a heated air output B.

The retrofitting process 1200 further comprises fluidly coupling an outlet of the distillation device 210 to an inlet 331 of the fin-fan heat exchanger 320 via a fluid line 391 (step 1206). The inlet 331 is in fluid communication with the bundle of finned tubes 326 disposed through a housing 322 of the fin-fan heat exchanger 320 as described previously herein.

In various embodiments, the retrofitting process 1200 further comprises fluidly coupling an outlet 339 of the fin-fan heat exchanger 320 to one of the condenser 222, a vent condenser 224, or a reflux tank 230 via a fluid line 392 (step 1208). In various embodiments, the condenser 222 and/or the vent condenser 224 can be configured to further condense the heated vapor 202 that is output from the outlet 339 of the fin-fan heat exchanger 320. In various embodiments, the condenser 222 and the vent condenser 224 can be scrapped and the fluid line 392 can directly couple the outlet 339 of the fin-fan heat exchanger 320 to the reflux tank 230. In this regard, by providing a fin-fan heat exchanger 320 adaptable to fully condense the heated vapor 202, the condenser 222 can be removed and scrapped, in accordance with various embodiments. In various embodiments, by keeping the condenser 222 and the vent condenser 224 in the system 300 from FIG. 3A, the fin-fan heat exchanger 320 can be optimized for heating air that is output as the heated air output B, which can result in a more efficient system relative to a system where the fin-fan heat exchanger 320 is also configured as the condenser 222 and/or the vent condenser 224.

In various embodiments, the retrofitting process 1200 further comprises installing a compressor 340 downstream from the fin-fan heat exchanger 320 (step 1210) and fluidly coupling an outlet 329 of the fin-fan heat exchanger 320 to an inlet 341 of the compressor 340 via a fluid line 393 (step 1212). In various embodiments, the fluid line 393 can comprise one or more tube assemblies, one or more duct assemblies, or the like configured to route a heated air that is output from the outlet 329 of the fin-fan heat exchanger 320 to the compressor 340 as described previously herein. In various embodiments, an outlet of each of a plurality of the fin-fan heat exchanger 320 can be coupled the compressor 340. In various embodiments, each of a plurality of the fin-fan heat exchanger 320 can correspond to a respective compressor in a plurality of the compressor 340. The present disclosure is not limited in this regard.

The retrofitting process 1200 further comprises fluidly coupling an outlet 349 of the compressor 340 to one or more devices 305 in the production plant 205 (step 1214). In various embodiments, the one or more devices from step 1214 includes a boiler (e.g., boiler 111 from process 100 in FIG. 1). In various embodiments, step 1214 can further comprise replacing a gas-powered boiler with a boiler configured to receive a super-heated air. In various embodiments, step 1214 can further comprise retrofitting a gas-powered boiler with a heating element configured to receive the super-heated air. In this regard, the retrofitting process 1200 can comprise retrofitting existing devices within the production plant 205 or replacing existing devices within the production plant 205 with similar devices that are configured to receive the super-heated air generated from the system 300. For example, step 1214 can further comprise replacing a gas-powered dryer with a dryer configured to receive at least a portion of a super-heated air from the outlet 349 of the compressor 340, step 1214 can further comprise replacing a gas-powered boiler with a boiler configured to boil water with the super-heated air received from the outlet 349 of the compressor 340, and/or step 1214 can further comprise replacing a gas-powered evaporator with an evaporator configured to be powered by steam generated from flowing at least a portion of the super-heated air over a water supply, in accordance with various embodiments. The retrofitting process 1200 can further comprise installing a steam powered turbine 150 and fluidly coupling the steam powered turbine 150 to a boiler 111 that is configured to boil water in response to receiving the super-heated air. In this regard, the steam powered turbine 150 can be configured to generate electricity for an electrical component 152 (e.g., an electrically powered device, an energy storage device, or the like) or a plurality of electrical components 152.

Referring now to FIGS. 2, 4, 5, 6, 7, 8, and 13, a retrofitting process 1300 (FIG. 13) for retrofitting a system 400, 500, 600, 700, 800 (FIG. 4, FIG. 5, FIG. 6, FIG. 7, and/or FIG. 8) into a system 200 in a production plant 205 for forming a system that is configured to recycle energy in the production plant 205 (FIG. 2) is illustrated, in accordance with various embodiments. The retrofitting process 1300 comprises de-coupling various fluid lines in a production plant 205 (step 1302). For example, for system 400 and system 500, the fluid line 201 can be decoupled from the distillation device 210 and the condenser 222. For system 600 and system 700, fluid line 262 can be decoupled from the condenser 222 and the evaporative cooling tower 240. For system 800, fluid line 262 can be decoupled from the condenser 222 and the evaporative cooling tower, fluid line 264 can be decoupled from the heat exchanger 282 and the evaporative cooling tower 240, the fluid line 265 can be decoupled from the heat exchanger 284 and the evaporative cooling tower 240, the common supply header 251 can be de-coupled from each respective fluid line in the system 200 from FIG. 2, and/or the common return header 261 can be de-coupled from each respective fluid line in the system 200 from FIG. 2.

The retrofitting process 1300 further comprises installing a refrigerant loop of a heat pump 405, 505 in the production plant 205 (step 1304). For example, step 1304 can comprise installing two or more heat exchangers (e.g., heat exchanger 872, heat exchanger 874, heat exchanger 876, heat exchanger 882, heat exchanger 410, heat exchanger 430, and/or heat exchanger 530) (step 1304), installing an expansion valve 408, installing a compressor 406, and installing each of the fluid lines 491, 492, 493, 494 to form the refrigerant loop 401.

In various embodiments, step 1304 can further comprise forming an evaporator 402 and a condenser 404 of a heat pump 405, 505 from the two or more of the heat exchangers installed in step 1304 (e.g., heat exchanger 872, heat exchanger 874, heat exchanger 876, and/or heat exchanger 410 can form the evaporator 402, the heat exchanger 430 can form the condenser 404, or the like). In this regard, at least one of the two or more heat exchangers can define a portion of a refrigerant loop 401 disposed between the expansion valve 408 and the compressor 406 (e.g., heat exchanger 872, heat exchanger 874, heat exchanger 876, and/or heat exchanger 410) and at least one of the two or more heat exchangers can define a portion of the refrigerant loop 401 between the compressor 406 and the expansion valve 408 (e.g., heat exchanger 430, 530).

In various embodiments, after installing an evaporator 402 and a condenser 404 of the heat pump 405, 505 during step 1304, the expansion valve 408, the compressor 406, and the fluid lines 491, 492, 493, 494 can be installed to form the refrigerant loop 401 of the heat pump 405, 505 as described previously herein. In various embodiments, step 1304 of the retrofitting process 1300 can further comprise disposing the refrigerant in the refrigerant loop 401 prior to completing a formation of the refrigerant loop 401. In this regard, the refrigerant can be disposed in fluid lines 491, 492, 493, 494 prior to a final coupling of one of the fluid lines 491, 492, 493, 494 to the expansion valve 408, the compressor 406, and the two or more heat exchangers that form the evaporator 402 and the condenser 404 of the heat pump 405, 505, or in any other manner known in the art of heat pumps. The present disclosure is not limited in this regard.

In various embodiments, the retrofitting process 1300 can further comprise installing any additional heat exchangers in other areas of the production plant 205 (e.g., adding heat exchanger 882 or any other additional heat exchangers based on the respective system being retrofitted) (step 1305). In this regard, any additional heat exchangers that may enable various aspects of the systems disclosed herein (e.g., system 300, system 400, system 500, system 600, system 700, and/or system 800) may be installed in step 1305. The present disclosure is not limited in this regard.

The retrofitting process 1300 further comprises coupling one or more fluid sources to the two or more heat exchangers (e.g., the heated vapor 202 from the distillation device 210, water from the evaporative cooling tower 240, a beer mash being supplied to the fermentation device 280, ambient air from an external environment for heat exchanger 430, a fluid supply 510 for heat exchanger 530, or the like) (step 1306). For example, for system 400, 500 the heat exchanger 410 can be fluidly coupled to the distillation device 210 via a fluid line 481 that extends from an outlet of the distillation device 210 to an inlet plenum 415 of the heat exchanger 410. Similarly, an outlet plenum 416 of the heat exchanger 410 can be fluidly coupled to one of the one or more condensers 399 or the reflux tank 230 via a fluid line 482. In this regard, the fluid lines 481, 482 can replace the fluid line 201 of the system 200 from FIG. 2, in accordance with various embodiments. Accordingly, after step 1306, when forming the system 400, 500 from system 200, a fluid path can be defined from an output of the distillation device 210, through the fluid line 481 to an inlet plenum 415 of the heat exchanger 410, through the heat exchanger 410, out an outlet plenum 416 of the heat exchanger 410, and to the one or more condensers 399 via the fluid line 482, in accordance with various embodiments.

For the system 600, 700, the heat exchanger 410 can be fluidly coupled to the evaporative cooling tower 240 through the condenser 222 via fluid lines 252, 601, 602. In this regard, the fluid lines 601, 602 can replace the fluid line 262 and fluid line 252 can remain from the production plant 205 prior to performing the retrofitting process 1300. The fluid line 601 can extend from an outlet of the condenser 222 to an inlet plenum 415 of the heat exchanger 410, and the fluid line 602 can extend from an outlet plenum 416 of the heat exchanger 410 back to the common return header 261. Accordingly, after step 1306, when forming the system 600, 700 from system 200, a fluid path can be defined from the evaporative cooling tower 240 through a common supply header 251 to a fluid line 252, through the condenser 222, out the fluid line 601 to the inlet plenum 415 of the heat exchanger 410, through the heat exchanger 410, out the outlet plenum 416 of the heat exchanger 410, through the fluid line 602 to the common return header 261, and back to the evaporative cooling tower 240 as described previously herein.

For the system 800, the common supply header 251 and the common return header 261 can be fluidly coupled to various heat exchangers in the system 800 as described previously herein. For example, the common supply header

251 can be fluidly coupled to heat exchanger 872 via a fluid line 831. Similarly, the common supply header 251 can be fluidly coupled to heat exchanger 284 via the fluid line 821 and heat exchanger 282 via fluid line 811. The common return header 261 can be fluidly coupled to various return lines from the heat exchangers installed in steps 1304, 1305 (e.g., fluid line 833 from heat exchanger 882, fluid line 823 from heat exchanger 874, fluid line 813 from heat exchanger 876, fluid line 602 from heat exchanger 410). In this regard, various additional fluid circuits from the evaporative cooling tower 240 through one or more respective heat exchangers can be added into the production plant 205 in response to retrofitting the system 200 in the production plant 205 with one or more of the systems disclosed herein (e.g., system 400, system 500, system 600, system 700, and/or system 800), in accordance with various embodiments.

The retrofitting process 1300 further comprises fluidly coupling an outlet of each of the one or more heat exchangers that form a condenser 404 of the heat pump 405, 505 (e.g., the heat exchanger 430 and/or the heat exchanger 530) to one or more devices 305 in the production plant (step 1308). In various embodiments, for the system 500, system 700, and/or system 800, the retrofitting process 1300 can further comprise coupling a fluid supply 510 to an inlet of the heat exchanger 530 and fluidly coupling a pump 520 to the fluid supply 510. The pump 520 can be configured to pump water from the fluid supply through the heat exchanger 530 to generate steam during operation of the system 500. In various embodiments, the fluid supply 510 can be installed in the production plant 205 during the retrofitting process 1300, or the fluid supply 510 can be a fluid supply 510 that was previously installed in the production plant 205 (e.g., water supply 249 of the evaporative cooling tower 240 from FIG. 2).

In various embodiments, the steam can be generated in response to the water absorbing heat from the refrigerant 499 as the refrigerant travels through the condenser 404 of the heat pump 505 (e.g., heat exchanger 530) between an outlet of the compressor 406 and an inlet of the expansion valve 408. In various embodiments, as described previously herein, the one or more devices 305 in system 500 can comprise a turbine (e.g., turbine 150 from FIG. 1). The turbine 150 can comprise a steam-powered turbine. In this regard, the steam that is generated during operation of the system 500 by pumping the water from the fluid supply 510 through the heat exchanger 530 can be configured to power the steam-powered turbine, and electrical power that is generated from the steam-powered turbine can be recycled into the production plant (e.g., to an electrical component 152 as described with respect to process 100 from FIG. 1).

In various embodiments, for the system 400, the system 600, and/or the system 800, the retrofitting process 1300 can further comprise coupling a fan 434 to a housing 432 of the heat exchanger 430 (e.g., proximate an inlet 431 of the housing 432). In various embodiments, the fan 434 can be operably coupled to the housing 432 and configured to pull air (or push air) through a heat transfer region 435 the heat exchanger 430 and out an outlet 439 of the heat exchanger 430.

In various embodiments, for the system 400, the system 600, and the system 800, the one or more devices 305 from step 1308 can include a boiler (e.g., boiler 111 from process 100 in FIG. 1). In various embodiments, step 1308 can further comprise replacing a gas-powered boiler with a boiler configured to receive a super-heated air that is generated by flowing the air through the heat exchanger 430. In various embodiments, step 1308 can further comprise retrofitting a gas-powered boiler with a heating element configured to receive the super-heated air. In this regard, the retrofitting process 1300 can comprise retrofitting existing devices within the production plant 205 or replacing existing devices within the production plant 205 with similar devices that are configured to receive the super-heated air generated from the system 400, the system 600, and the system 800. For example, step 1308 can further comprise replacing a gas-powered dryer with a dryer configured to receive at least a portion of a super-heated air from the outlet 439 of the heat exchanger 430, step 1308 can further comprise replacing a gas-powered boiler with a boiler configured to boil water with the super-heated air received from the outlet 539 of the heat exchanger 530, and/or step 1308 can further comprise replacing a gas-powered evaporator with an evaporator configured to be powered by steam generated from flowing at least a portion of the super-heated air over a water supply, in accordance with various embodiments.

The retrofitting process 1300 can further comprise installing a steam powered turbine 150 and fluidly coupling the steam powered turbine 150 to a boiler 111 that is configured to boil water in response to receiving the super-heated air from the outlet 439 of the heat exchanger 430. In this regard, the steam powered turbine 150 can be configured to generate electricity for an electrical component 152 (e.g., an electrically powered device, an energy storage device, or the like).

Disclosed herein is a system for recycling energy in a production plant. In various embodiments, the system comprises: a distillation device; a condenser fluidly coupled to the distillation device; an evaporative cooling tower fluidly coupled to the condenser; a refrigerant loop comprising a refrigerant evaporator, a refrigerant condenser, an expansion valve, and a compressor fluidly coupled together by one or more fluid lines, the refrigerant evaporator comprising one or more of a first heat exchanger, the refrigerant condenser comprising one or more of a second heat exchanger, one of the one or more of the first heat exchanger configured to receive one of a heated vapor from the distillation device or a heated water supplied from the evaporative cooling tower through the condenser; one or more devices disposed in the production plant; and a fluid supply line extending from an outlet of the second heat exchanger to the one or more devices.

In various embodiments, a heat transfer region of the first heat exchanger is configured to condense the heated vapor received from the distillation device, the heat transfer region further configured to heat a refrigerant traveling in the refrigerant loop between the expansion valve and the compressor.

In various embodiments, the system further comprises a fan coupled to a housing of the second heat exchanger, the fan configured to drive air from an external environment through the second heat exchanger and out the outlet of the second heat exchanger to the one or more devices. In various embodiments, the one or more devices comprises a dryer configured to heat a feedstock prior to milling with a super-heated air received from the second heat exchanger.

In various embodiments, the refrigerant loop is configured to cycle a refrigerant therethrough, and wherein the refrigerant comprises carbon dioxide.

In various embodiments, the one or more devices comprises a dryer configured to dry a wet cake to form an animal feed product with a super-heated air received from the second heat exchanger.

In various embodiments, the one or more devices comprises a boiler configured to provide steam to at least one of the distillation device and a pre-fermentation device, and the boiler is configured to boil water with a super-heated air received from the outlet of the compressor.

In various embodiments, the one or more devices comprises one or more evaporators configured to boil away liquids from a process stream, and a super-heated air received from the outlet of the compressor is configured to generate steam to power an evaporator.

In various embodiments, the system further comprises a water supply and a pump, the pump configured to pump water from the water supply through the second heat exchanger and out the outlet of the second heat exchanger to the one or more devices. In various embodiments, the one or more devices comprises at least one of a steam powered turbine and a steam powered evaporator configured to boil away liquids from a process stream.

In various embodiments, the system further comprises an array of the first heat exchanger, wherein the array of the first heat exchanger is configured to cycle up a temperature of a refrigerant in response to the refrigerant traversing through the refrigerant loop.

A retrofitting process to form a system for recycling energy in a production plant is disclosed herein. In various embodiments, the retrofitting process comprises: de-coupling a plurality of fluid lines from a plurality of devices in the production plant; installing a refrigerant loop of a heat pump in the production plant, the refrigerant loop comprising a refrigerant evaporator, a refrigerant condenser, an expansion valve, and a compressor fluidly coupled together by one or more refrigerant fluid lines, the refrigerant evaporator comprising a first heat exchanger, the refrigerant condenser comprising a second heat exchanger; fluidly coupling a first of the plurality of devices to an inlet of the first heat exchanger via first replacement fluid line and fluidly coupling a second of the plurality of devices to an outlet of the first heat exchanger via a second replacement fluid line; and fluidly coupling an outlet of the second heat exchanger to a third of the plurality of devices in the production plant via a third replacement fluid line, the third replacement fluid line configured to receive one of a steam generated from the second heat exchanger or a heated air generated from the second heat exchanger.

In various embodiments, the first of the plurality of devices comprises a distillation device, and wherein the first replacement fluid line is configured to route a heated vapor through the first heat exchanger and out the second replacement fluid line.

In various embodiments, the first of the plurality of devices comprises a condenser configured to condense a heated vapor from a distillation device, the second of the plurality of devices comprises an evaporative cooling tower, and a water supplied from the evaporative cooling tower is routed through the condenser, out the first replacement fluid line to the first heat exchanger, and back to the evaporative cooling tower at least partially through the second replacement fluid line.

In various embodiments, the installing the refrigerant loop further comprises installing an array of heat exchangers to form the refrigerant evaporator, the array of heat exchangers including the first heat exchanger. In various embodiments, the retrofitting process further comprises fluidly coupling an evaporative cooling tower to each of the array of heat exchangers, wherein the array of heat exchangers are configured to cycle up a temperature of a refrigerant traversing therethrough.

In various embodiments, the retrofitting process further comprises coupling a fluid supply to an inlet of the second heat exchanger and fluidly coupling a pump to the fluid supply, wherein the pump is configured to pump water from the fluid supply through the second heat exchanger to generate the steam. In various embodiments, the third of the plurality of devices comprises a turbine, the steam from the refrigerant condenser configured to power the turbine to generate electrical energy.

In various embodiments, the retrofitting process further comprises coupling a fan to a housing of the second heat exchanger, the fan configured to one of pull or push air through the second heat exchanger.

In various embodiments, the third of the plurality of devices comprises one of a boiler, one or more evaporators, and a dryer, and the second heat exchanger is configured to heat the air by absorbing heat from a refrigerant traversing through the refrigerant loop to form the heated air that is provided to the third of the plurality of devices for use therein.

In various embodiments, the retrofitting process further comprises disposing a refrigerant in the refrigerant loop, the refrigerant comprising one of a hydrocarbon-based refrigerant, ammonia, carbon dioxide, or a hydrofluoroolefin (HFO) refrigerant.

A method for recycling energy in a production plant is disclosed herein. In various embodiments, the method comprises: cycling a refrigerant through a refrigerant loop of a heat pump, the refrigerant loop comprising a first heat exchanger disposed fluidly between an expansion valve and a compressor and a second heat exchanger disposed fluidly between the compressor and the expansion valve; flowing one of a heated vapor from a distillation device or a heated water from an evaporative cooling tower through the first heat exchanger, heat being absorbed by the refrigerant in response to flowing through the first heat exchanger; flowing a fluid through the second heat exchanger to form a super-heated fluid; and flowing the super-heated fluid to one or more devices in the production plant.

In various embodiments, the flowing the fluid comprises pumping water from a water supply through the second heat exchanger to form steam, and the one or more devices comprises a steam-powered turbine, wherein the method further comprises generating electricity by the steam-powered turbine in response to flowing the steam to the steam-powered turbine.

In various embodiments, the retrofitting process further comprises driving the fluid through a heat transfer region of the second heat exchanger, the fluid comprising air from an external environment.

In various embodiments, the cycling the refrigerant through the refrigerant loop further comprises flowing the refrigerant through an array of heat exchangers between the expansion valve and the compressor, wherein a temperature of the refrigerant is cycled up in response to traversing through the array of heat exchangers, the array of heat exchangers including the first heat exchanger. In various embodiments, the retrofitting process further comprises routing a water from the evaporative cooling tower to each of the array of heat exchangers, wherein a first portion of the water that is supplied to the first heat exchanger is a different temperature relative to a second portion of the water that is supplied to another of the array of heat exchangers.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative, additional functional relationships, or physical connections may be present in a practical system. However, the benefits, advantages, solutions to problems, and any elements that may cause any benefit, advantage, or solution to occur or become more pronounced are not to be construed as critical, required, essential features, or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts but not necessarily to denote the same or different materials.

Systems, methods, and apparatus' are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive, or to limit the principles described or illustrated herein to any precise form. Many modifications and variations are possible considering the above teaching.

What is claimed is:

1. A system for recycling energy in a production plant, the system comprising:
    a distillation device;
    a fin-fan heat exchanger comprising a bundle of finned tubes at least partially defining a first flow path and a plenum at least partially defining a second flow path, and a fan configured to drive air from an external environment into the plenum;
    a first fluid line extending from an outlet of the distillation device to an inlet of the first flow path;
    a compressor;
    a second fluid line extending from an outlet of the plenum to an inlet of the compressor; and
    a third fluid line extending from an outlet of the compressor to one or more devices in the production plant.

2. The system of claim 1, wherein the bundle of finned tubes are configured to receive a heated vapor from the distillation device via the first fluid line.

3. The system of claim 2, wherein the air absorbs heat from the heated vapor in response to traveling through the plenum of the fin-fan heat exchanger simultaneously with the heated vapor traversing through the bundle of finned tubes.

4. The system of claim 1, wherein:
    the fin-fan heat exchanger is configured to heat the air pulled therethrough from an ambient temperature to a first temperature and form a heated air, and
    the compressor is configured to heat the heated air from the first temperature to a second temperature.

5. The system of claim 4, wherein:
    the first temperature is between 100° F. (38° C.) and 150° F. (66° C.), and
    the second temperature is between 400° F. (204° C.) and 600° F. (316° C.).

6. The system of claim 1, wherein the one or more devices comprises at least one of a dryer, a boiler, and an evaporator.

7. The system of claim 1, wherein the one or more devices comprises a dryer configured to heat a feedstock prior to milling.

8. The system of claim 1, wherein the one or more devices comprises a dryer configured to dry a wet cake to form an animal feed product.

9. The system of claim 1, wherein:
    the one or more devices comprises a boiler configured to provide steam to at least one of the distillation device and a fermentation device, and
    the boiler is configured to boil water with a super-heated air received from the outlet of the compressor via the third fluid line.

10. The system of claim 1, wherein:
    the one or more devices comprises an evaporator configured to boil away liquids from a process stream, and
    a super-heated air received from the outlet of the compressor via the third fluid line is configured to generate steam to power the evaporator.

11. A retrofitting process for a production plant, the retrofitting process comprising:
    installing a fin-fan heat exchanger fluidly downstream from a distillation device, comprising a bundle of finned tubes at least partially defining a first flow path and a plenum at least partially defining a second flow path, and a fan configured to drive air from an external environment into the plenum;
    fluidly coupling an outlet of the distillation device to an inlet of the first flow path;
    installing a compressor downstream from the fin-fan heat exchanger;
    fluidly coupling an outlet of the plenum of the fin-fan heat exchanger to an inlet of the compressor; and
    fluidly coupling an outlet of the compressor to one or more devices in the production plant.

12. The retrofitting process of claim 11, wherein the fin-fan heat exchanger is configured to transfer heat from a vapor received from the distillation device to the air that is flowed through the fin-fan heat exchanger to form a heated air output.

13. The retrofitting process of claim 12, wherein the compressor is configured to receive the heated air output from the fin-fan heat exchanger to form a super-heated air output.

14. The retrofitting process of claim 11, further comprising:

fluidly disconnecting an evaporative cooling tower from the distillation device prior to the installing the fin-fan heat exchanger;

coupling a first fluid line to the outlet of the distillation device and an inlet plenum of the fin-fan heat exchanger, the inlet plenum fluidly coupled to the bundle of finned tubes disposed within a housing of the fin-fan heat exchanger; and coupling a second fluid line to an outlet plenum of the fin-fan heat exchanger and an inlet of one of the evaporative cooling tower or a reflux tank, the outlet plenum fluidly coupled to the bundle of finned tubes disposed within the housing of the fin-fan heat exchanger.

15. The retrofitting process of claim 11, wherein the one or more devices comprises at least one of a dryer, a boiler, and an evaporator.

16. The retrofitting process of claim 11, further comprising:

removing a gas-based power source from the one or more devices; and installing a heating element configured to utilize a super-heated air that is output from the compressor in the one or more devices.

17. The retrofitting process of claim 11, further comprising:

removing a gas-powered boiler from the production plant; and installing a boiler configured to boil a fluid in response to flowing a super-heated air from the compressor therethrough.

18. A method for recycling energy in a production plant, the method comprising:

flowing air through a heat transfer region of a fin-fan heat exchanger simultaneously with flowing a heated vapor received from a distillation device in the production plant through a bundle of finned tubes disposed in the heat transfer region of the fin-fan heat exchanger;

responsive to the flowing the air, forming a heated air at an outlet of the fin-fan heat exchanger;

routing the heated air from the outlet of the fin-fan heat exchanger to a compressor;

heating, in response to flowing the heated air through the compressor, the heated air from a first temperature to a second temperature to form a super-heated fluid, the second temperature at least double the first temperature; and routing the super-heated fluid to one or more devices in the production plant.

19. The method of claim 18, further comprising heating, via the one or more devices in the production plant, at least one of an incoming corn feedstock and a product being dried with the super-heated fluid.

20. The method of claim 18, wherein the one or more devices comprises a boiler, and wherein the method further comprises:

generating, via the boiler, additional steam from the super-heated fluid; and routing the steam to at least one of the distillation device, a fermentation device, and a steam-powered turbine.

* * * * *